US012726261B2

(12) United States Patent
Speidel et al.

(10) Patent No.: US 12,726,261 B2
(45) Date of Patent: Sep. 1, 2026

(54) METHOD FOR INTERFERENCE MINIMIZATION AND OPTIMIZATION OF ORBITAL MOBILE CELLULAR SERVICES

(71) Applicant: Lynk Global, Inc., Falls Church, VA (US)

(72) Inventors: Tyghe Robert Speidel, Falls Church, VA (US); Charles E. Miller, Falls Church, VA (US)

(73) Assignee: Lynk Global, Inc., Falls Church, VA (US)

( * ) Notice: Subject to any disclaimer, the term of this patent is extended or adjusted under 35 U.S.C. 154(b) by 566 days.

(21) Appl. No.: 17/742,339

(22) Filed: May 11, 2022

(65) Prior Publication Data

US 2022/0368411 A1 Nov. 17, 2022

Related U.S. Application Data

(60) Provisional application No. 63/187,065, filed on May 11, 2021.

(51) Int. Cl.
*H04B 7/204* (2006.01)
*H04B 7/185* (2006.01)

(52) U.S. Cl.
CPC ................................ *H04B 7/18513* (2013.01)

(58) Field of Classification Search
None
See application file for complete search history.

(56) References Cited

U.S. PATENT DOCUMENTS 10,348,394 B1 7/2019 Bark et al.
2009/0075645 A1 3/2009 Karabinis
2018/0109991 A1 4/2018 Whelan et al.
2019/0334615 A1* 10/2019 Speidel ................ H04B 7/2048
2020/0244349 A1 7/2020 Speidel et al.

OTHER PUBLICATIONS

Su et al., "Broadband LEO Satellite Communications: Architectures and Key Technologies", IEEE Wireless Communications, vol. 26, No. 2, pp. 55-61, Apr. 2019.
International Search Report Issued in PCT Application No. PCT/US2022/028855, Mailed Aug. 26, 2022.

* cited by examiner

*Primary Examiner* — Gary Lafontant
(74) *Attorney, Agent, or Firm* — Haynes and Boone, LLP

(57) ABSTRACT

A process for computing and evaluating impact of interference presented by an orbital cellular service augmentation network operating to provide service that might overlap with a terrestrial network is disclosed. A process for eliminating, minimize, and/or reducing risk or probability of harmful interference can be provided, such that the deployment of orbital mobile cells can augment the terrestrial network and/or its coverage map that might be provided by existing or future terrestrial cells/transmitters.

20 Claims, 15 Drawing Sheets

| CQI index | Modulation | Code rate x 1024 | Efficiency (bps/Hz) | SINR estimate |
|---|---|---|---|---|
| 0 | out of range | | | |
| 1 | QPSK | 78 | 0.1523 | 5.0 |
| 2 | QPSK | 193 | 0.3770 | ~ -3.0 |
| 3 | QPSK | 449 | 0.8770 | ~ 1.0 |
| 4 | 16QAM | 378 | 1.4766 | ~ 5.0 |
| 5 | 16QAM | 490 | 1.9141 | ~ 8.1 |
| 6 | 16QAM | 616 | 2.4063 | ~ 9.6 |
| 7 | 64QAM | 466 | 2.7305 | ~ 11.0 |
| 8 | 64QAM | 567 | 3.3223 | ~ 13.0 |
| 9 | 64QAM | 666 | 3.9023 | ~ 15.1 |
| 10 | 64QAM | 772 | 4.5234 | ~ 16.9 |
| 11 | 64QAM | 873 | 5.1152 | ~ 18.9 |
| 12 | 256QAM | 711 | 5.5547 | ~ 20.0 |
| 13 | 256QAM | 797 | 6.2266 | ~ 22.0 |
| 14 | 256QAM | 885 | 6.9141 | ~ 24.0 |
| 15 | 256QAM | 948 | 7.4063 | ~ 27.0 |

| CQI index | Modulation | Code rate x 1024 | Efficiency (bps/Hz) | SINR estimate |
|---|---|---|---|---|
| 0 | out of range | | | |
| 1 | QPSK | 78 | 0.1523 | 5.0 |
| 2 | QPSK | 193 | 0.3770 | ~ -3.0 |
| 3 | QPSK | 449 | 0.8770 | ~ 1.0 |
| 4 | 16QAM | 378 | 1.4766 | ~ 5.0 |
| 5 | 16QAM | 490 | 1.9141 | ~ 8.1 |
| 6 | 16QAM | 616 | 2.4063 | ~ 9.6 |
| 7 | 64QAM | 466 | 2.7305 | ~ 11.0 |
| 8 | 64QAM | 567 | 3.3223 | ~ 13.0 |
| 9 | 64QAM | 666 | 3.9023 | ~ 15.1 |
| 10 | 64QAM | 772 | 4.5234 | ~ 16.9 |
| 11 | 64QAM | 873 | 5.1152 | ~ 18.9 |
| 12 | 256QAM | 711 | 5.5547 | ~ 20.0 |
| 13 | 256QAM | 797 | 6.2266 | ~ 22.0 |
| 14 | 256QAM | 885 | 6.9141 | ~ 24.0 |
| 15 | 256QAM | 948 | 7.4063 | ~ 27.0 |

FIG. 1

| No | Variable | Description |
|---|---|---|
| 1 | Site ID | Each transmitter has a Site ID, an identifier for the tower/mast. |
| 2 | Cell ID | Each transmitter has a unique Cell ID, an identifier for the unique cell. |
| 3 | Band | The frequency band used by the cell (e.g. B2, B4, B5, B14, etc.) |
| 4 | Carrier | The carrier block used within the band used by the cell (e.g. F1, F2, etc.) |
| 5 | Longitude | The longitude of the site in degrees. |
| 6 | Latitude | The latitude of the site in degrees. |
| 7 | Height | The height of the transmitter on the site in meters. |
| 8 | Azimuth | The azimuth angle of the antenna boresight (degrees from due North) |
| 9 | Mechanical Downtilt | The mechanical down tilt angle of the antenna. |
| 10 | Electrical Downtilt | The electrical down tilt angle of the antenna. |
| 11 | Downlink EARFCN | The EARFCN of the downlink carrier. |
| 12 | Center Downlink Frequency | The center frequency corresponding to the EARFCN of the downlink carrier |
| 13 | Uplink EARFCN | The EARFCN of the uplink carrier. |
| 14 | Center Uplink Frequency | The center frequency corresponding to the EARFCN of the uplink carrier |
| 15 | Cell Radius | The maximum cell radius for service coverage. |
| 16 | Cell Bandwidth | The bandwidth deployed by the cell (e.g. 5 MHz, 10 MHz, 20 MHz, etc.) |
| 17 | Max Cell Power per RB | The max cell transmit power per resource block (e.g. 180 kHz) in dBm/RB |
| 18 | Antenna Gain | The gain of the antenna for the cell (accounting for electrical tilt) in dBi |
| 19 | Antenna VBW | The full-cone half power vertical beamwidth of the cell antenna. |
| 20 | Antenna HBW | The full-cone half power horizontal beamwidth of the cell antenna. |

FIG. 2

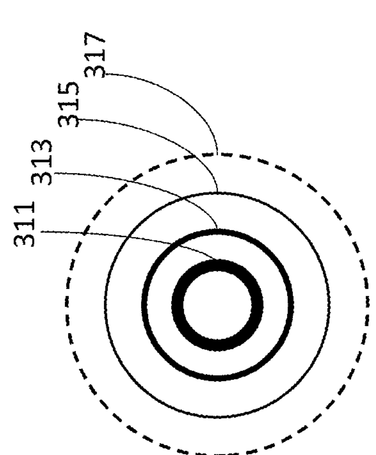
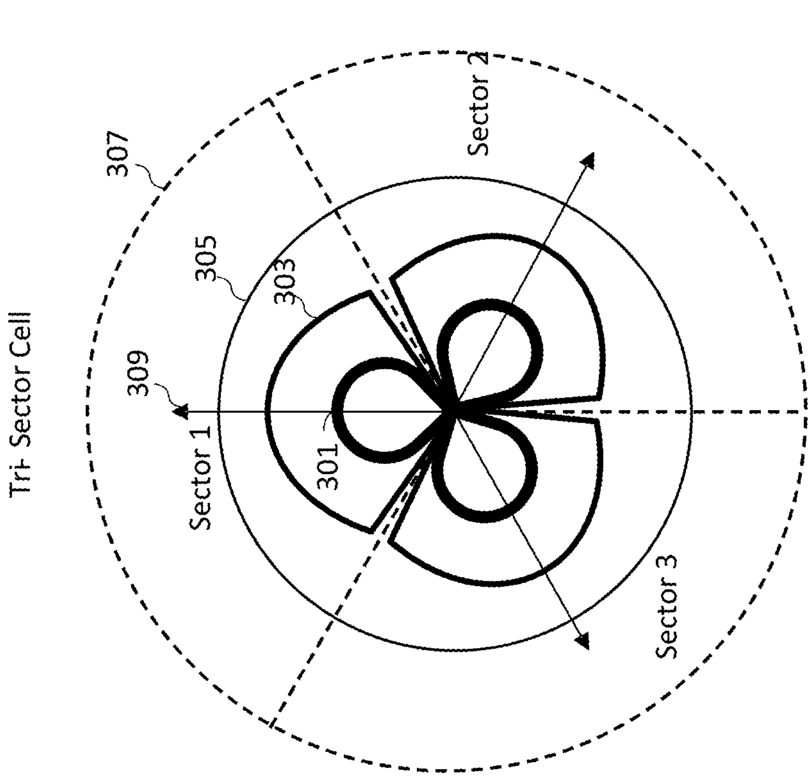
FIG. 3

| Parameter | Value | Units |
|---|---|---|
| Field Strength Limit at CGSA Edge (dB) | 40 | dBμV/m |
| Field Strength Limit at CGSA Edge (base) | 0.0001 | V/m |
| Characteristic Impedance of Air | 376.99 | Ohms |
| Power flux Density (base) | 2.65 E-11 | W/m^2 |
| Power flux Density (dBm/m^2) | -75.76 | dBm/m^2 |
| Wavelength, $\lambda$, of 856.5 MHz signal | 35 | cm |
| Effective 0 dBi antenna area ($\lambda^2/4\pi$) | 0.0097 | m^2 |
| Corresponding signal power at cell phone | **-95.87** | dBm |

FIG. 4

METHOD FOR INTERFERENCE MINIMIZATION AND OPTIMIZATION OF ORBITAL MOBILE CELLULAR SERVICES

CROSS-REFERENCES TO PRIORITY AND RELATED APPLICATIONS

The following applications are related and may be referenced herein:

1) U.S. Non-provisional patent application Ser. No. 15/857,073, filed Dec. 28, 2017 entitled "Method and Apparatus for Handling Communications between Spacecraft Operating in an Orbital Environment and Terrestrial Telecommunications Devices That Use Terrestrial Base Station Communications" (hereinafter "Speidel I");
2) U.S. Provisional Patent Application No. 62/465,945, filed Mar. 2, 2017 entitled "Method for Low-Cost and Low-Complexity Inter-Satellite Link Communications within a Satellite Constellation Network for Near Real-Time, Continuous, and Global Connectivity" (hereinafter "Speidel II"); and
3) U.S. Provisional Patent Application No. 62/490,298 filed Apr. 26, 2017 entitled "Method for Communications between Base Stations Operating in an Orbital Environment and Ground-Based Telecommunications Devices" (hereinafter "Speidel III").
4) PCT Patent Application No. PCT/US2019/050030 filed Sep. 6, 2019 entitled "Cellular Core Network and Radio Access Network Infrastructure and Management in Space" (hereinafter "Speidel IV").

The entire disclosures of applications recited above are hereby incorporated by reference, as if set forth in full in this document, for all purposes.

FIELD

The present disclosure generally relates to evaluating, minimizing, and optimizing interference of orbital mobile cellular services based on terrestrial services mappings and more particularly to computing orbital mobile cellular signal configurations based on terrestrial services and/or coverage needs.

BACKGROUND

Cellular services might be provided to end user equipment (UE) located in a geographic area by terrestrial base stations that wirelessly connect to UE and have backchannels to telecommunications networks, the Internet and other channels. These terrestrial base stations might be strategically placed in particular locations and configured with particular antennas with particular lobe and beam patterns, particular signal strengths, particular frequency uses, particular protocol uses, and possibly other configurations to provide service to UE devices that might be in range of those terrestrial base stations. In some cases, it might not be possible, practical, and/or economical to install enough terrestrial base stations to reach all UE devices at all geographic locations and altitudes.

To provide coverage at some locations (e.g., some location in three dimensions on the surface of the Earth, or above or below the surface of the Earth), and airborne base station might be provided, such as one deployed using drones or balloons. Additionally, some coverage might be desired from an orbital base station. Where an orbital base station is orbiting in a particular orbit, the relative position of the orbital base station and a UE device might be such that the orbital base station is moving at a relatively high orbital velocity and is within range of the UE device for only a short period. Furthermore, an orbital base station might be configured to appear to a UE device to be a terrestrial base station, notwithstanding the distance from the orbital base station to the UE device, the Doppler shift due to the orbital velocity, and the limited window of connectivity as the orbital base station continues in its orbit. At times when the orbital base station is appearing to the UE device to be a terrestrial base station, or to appear to be compatible with a terrestrial base station, UE devices can obtain cellular services notwithstanding the fact that the UE devices might not be specially configured to communicate with satellites. In such cases, it might be useful to have an orbital base station configured to minimize interference and/or work well in the presence of terrestrial base stations that might be using the same protocols, frequency bands, etc.

Methods and apparatus for such configuration might be useful.

SUMMARY

A process for computing and evaluating impact of interference presented by an orbital cellular service augmentation network operating to provide service that might overlap with a terrestrial network is disclosed. A process for eliminating, minimize, and/or reducing risk or probability of harmful interference can be provided, such that the deployment of orbital mobile cells can augment the terrestrial network and/or its coverage map that might be provided by existing or future terrestrial cells/transmitters.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the surface computation method, as defined in the claims, is provided in the following written description of various embodiments of the disclosure and appendices.

BRIEF DESCRIPTION OF THE DRAWINGS

Various embodiments in accordance with the present disclosure can be discerned by a person of ordinary skill in the art upon reading this disclosure and the inventions herein can be understood without requiring reference to drawings.

FIG. 1 illustrates an example of how different code rates might be used given a particular channel quality.

FIG. 2 illustrates an example of a set of performance parameters.

FIG. 3 illustrates RSSI coverage maps for network cells.

FIG. 4 illustrates a conversion table.

DETAILED DESCRIPTION

Figure 5:
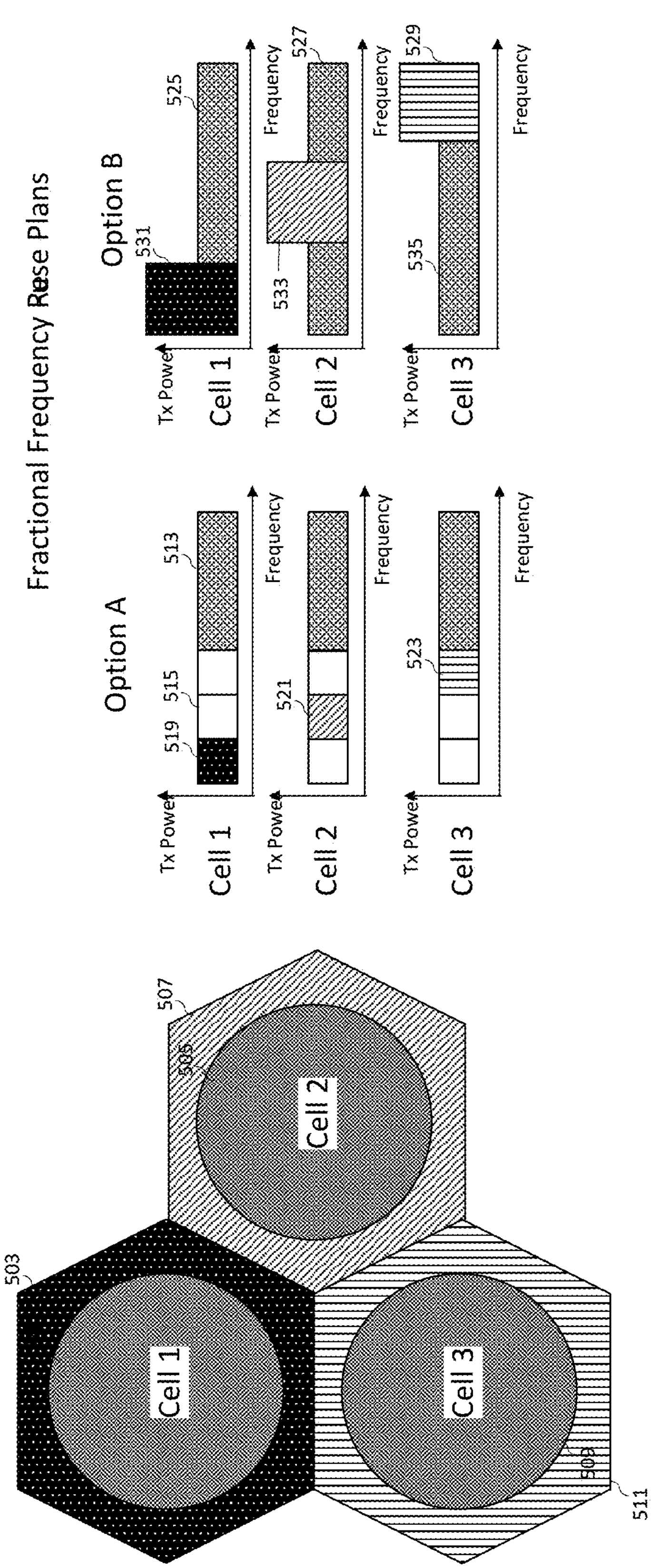
FIG. 5 illustrates aspects of fractional frequency reuse.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Speidel I, Speidel II, Speidel III, and Speidel IV teach various techniques and embodiments for how orbital cellular services might be deployed. For example, a network of satellites and corresponding ground stations might provide orbital base station services by deploying 3GPP radio access networks (e.g., 5G NR gNBs, 4G LTE eNBs, 2G GSM BTSs, etc.) that are compatible with standard 3GPP-compliant handsets or user equipment (UE) that reside on or near the surface of the Earth. An orbital base station network as might be described therein can effectively create virtualized cells on the Earth to enable standard 3GPP-compliant user equipment to remain connected without a viable signal from an existing terrestrial cell tower. The orbital base station network can appear transparent to these 3GPP-compliant UE devices, allowing the UE to seamlessly transition to an orbital base station and need not be aware that it is connected to an orbital base station. Instead, the UE might process signals as if the orbital base station on the satellite is merely a distant cell tower.

One challenge associated with the deployment of orbital 3GPP radio access networks is that they may have to maintain compatibility with the existing networks deploying services from terrestrial based transmitters on the ground. A terrestrial transmitter deploying an LTE service, for instance, may take the form of a macro cell, small cell, femto cell, etc., where each transmitter provides a certain radius of coverage, or geographical area of coverage. The terrestrial transmitters may only enable mobile user equipment to remain connected in certain geographies described by the terrestrial transmitters "coverage map", or geographical areas of coverage. Furthermore, the terrestrial coverage map may actually exist in reality as various layers of coverage, where each layer of coverage is a discrete block of frequencies, or band, which are differentiated from other layers of coverage by frequency orthogonality. For instance, a terrestrial network may deploy various bands on the terrestrial infrastructure used to deploy the services. Specifically, a terrestrial network might use licensed frequency blocks in cellular bands including, but not limited to 600 MHz, 700 MHz, 800 MHz, 900 MHz, 1700 MHz, 1800 MHz, 1900 MHz, 2100 MHz, 2600 MHz, 3500 MHz, etc.

Methods are described herein for evaluating and optimizing (and/or minimizing) deployment of orbital cellular services to augment existing terrestrial based cellular network coverage. Based on aggregate coverage of a certain band over a mobile network operator's licensed geography, there may be geographies in which spectrum is licensed for that operator but is not provided coverage by the reach of the existing terrestrial transmitters. The edge of coverage may be intentional because the incremental coverage provided by adding another transmitter does not merit the investment. This may be because the areas adjacent to the edge of coverage are significantly limited in terms of demand per unit area.

An orbital cellular network can provide options for terrestrial mobile network operators to expand coverage of their licensed spectrum. Since a satellite operates from orbit, its ability to spread the use of spectrum over wide areas offers the provider an opportunity to provide expansive coverage footprints that exceed those of a typical macro cell (which might normally be used to extended coverage in low population density areas of the world). For instance, a typical terrestrial macro cell might provide a coverage radius of 5, 10, 20, or 30 km depending on the height of the transmitters, its antenna gain, frequency, and other factors.

A typical orbital macro cell might provide coverage radiuses that vary as well based on antenna, front end, and orbit design, but might span a wide range. For instance, 5 km, 15 km, 30 km, 50 km, 75 km, 100 km, 150 km, or 200 km in radius depending on antenna directivity, gain, and beamwidth. As a result, a single beam, or cell from a satellite could accommodate coverage over orders of magnitude more surface and/or volume area, increasing the coverage economics of that cell by orders of magnitude as a result. In turn, an orbital cellular transmitter can provide profitable coverage for population densities that are orders of magnitude smaller than those that can be covered profitably by a typical terrestrial macro cell.

When deploying an orbital cellular transmitter cell, or beam, alongside a terrestrial transmitter cell, or beam, various interference scenarios is considered, and it is nonobvious how an orbital cellular service could optimize the locations and radius of coverage for beams that might be used to augment the existing terrestrial network coverage in a way that minimizes, reduces, or eliminates, risks of harmful interference. The method may also optimize or maximize cell throughput per unit area based on population density profiles in uncovered or under-covered locations in and around existing terrestrial coverage offered by the terrestrial network transmitters.

Modern cellular networks are typically designed and organized based on where tower masts are available for transmitter placement. The locations of these transmitters are often based on economic and regulatory viability. Being a transmitter, its location can be subject to local regulations, which may prevent the ideal geometry for the location of transmitters in a cellular network. Furthermore, the locations of these transmitters may be subject to geological limitations. Cellular tower base stations cannot simply be constructed in any location on the planet, or in the seas.

A typical conventional cellular network is primarily deployed using terrestrial towers, or masts, with antennas and radio equipment that are fixed in location and with fixed general direction of pointing. Modern cellular networks may employ MIMO and beam steering techniques to split cells and dynamically steer beams, but generally this is done across some static coverage area that does not change frequently. As a result, the cellular network protocols used are typically designed with static base stations, or cell towers, and mobile UEs in mind. Herein, a mobile terminal is a device that is mobile or portable and can connect with a network over a wireless interface such as an air interface with a base station that might be terrestrial or orbital. The mobile terminal might be a "user equipment" or "UE" is referred to in various protocol descriptions and might have other functionality.

Some air interfaces that operate using 3GPP protocols support dynamic modulation and coding schemes, often referred to as the MCS. For instance, in LTE a Channel Quality Indicator (CQI) is a parameter that is used to correspond to an MCS that enables a certain spectral efficiency, often measured in bps/Hz, over a wireless channel. Based on the signal quality of coverage, the base station will command the device to a certain CQI in the air interface protocol. When the device is operating far from the base station, with low signal power, the CQI will be low, operating at low spectral efficiency so that the link budget can close at low signal-to-interference plus noise (SINR) values. When the device is operating closer to the base station, with high signal power, the CQI will be high, using the higher SINR for a higher spectral efficiency on the air interface. Other protocols might have similar approaches, wherein generally higher channel quality allows for larger code rates.

FIG. 1 illustrates an example of how different code rates might be used given a particular channel quality. The data in the table shown in FIG. 1 might be stored in memory on a device with the device programmed to switch parameters based on channel quality. This particular example is the CQI table used with the LTE protocol of the 3GPP TS 36.213 version 12.3.0 Release 12 protocol, specifically Modulation and Coding Scheme (MCS) Table 7.2.3-2 therein. SINR threshold requirements for each CQI are not specified by the 3GPP protocol but they can be estimated based on link models for fading, Doppler spread, etc. As shown there, wireless links between UEs and eNBs might operate with spectral efficiencies of around 0.1523 to 7.4063 bps/Hz, which corresponds to an SINR range of approximately −5 to 27 dB. As a result, the LTE protocol works very well in high interference environments.

It is common in implementation for networks to leverage tri-sector macro cell sites, where a tower, or mast, has three antennas pointed in azimuth angles (angle relative to due north) that are separated by 120 degrees. It is also common in implementation to use omnidirectional antennas for small cell sites (micro cells, femto-cells, pico-cells, etc.). Each cell site in a network might be configured to operate based on a set of performance parameters.

FIG. 2 illustrates an example of a set of performance parameters, as might be used in a device that is programmed to consider one or more of the performance parameters and stored in computer-readable memory. Other variations are possible.

Based on the values of one or more of the performance parameters, a device or network computer somewhere in a telecommunications network can compute a downlink and uplink coverage map for a given cell, in terms of the downlink and uplink receive signal energy power (e.g., Received Signal Strength Indicator (RSSI) or Reference Signal Receive Power (RSRP), in dBm). This can be done by using current values of performance parameters combined with a mesh of geospatial points in a network area of coverage and a link budget propagation model. A link budget—an accounting of gains and losses in signal strength—might be computed as shown in Equation 1, where RSSI is the signal energy power at a given location, $P_t$ is the transmitter power, $G_t$ is the transmitter antenna gain, $G_r$ is the receiver antenna gain, Pnt is the pointing loss associated with being offset from the pointing vector of the antenna main lobe or boresight, $L_{atm}$ is atmospheric loss, $L_{pol}$ is the polarization loss, and $L_{path}$ is the path loss. The path loss might be based on a $(1/r)^2$ model, a $(1/r)^n$ model, a propagation model such as Longley Rice, or another model. A value of RSSI, and other parameters in Equation 1 might be represented in units of decibels or other logarithmic interpretation of signal power in watts (dBW) or milliwatts (dBm).

$$\mathrm{RSSI}=P_t+G_t+G_r+L_{pnt}+L_{atm}+L_{pol}+L_{path} \quad \text{(Eqn. 1)}$$

A value of RSRP, representing a signal power across a bandwidth of a reference signal, which may be a smaller bandwidth than the bandwidth used over an entire transmitter power profile, might be a smaller number, some dB below the RSSI value for a given link. When network transmitter performance parameters, a mesh of geospatial points, and link budget models are combined, Equation 1 can be used to create a coverage map in RSSI for each cell. Certain protocols, such as LTE, might map the serving signal power as the RSRP. An RSSI coverage map for a tri-sector macro cell operating on the same frequency, or co-channel, can be computed from the analysis described herein and might look like the RSSI coverage map of FIG. 3.

FIG. 3 illustrates RSSI coverage maps for network cells, one of which is a tri-sector cell and the other of which is an omnidirectional cell. The tri-sector cell has three sectors created by three antennas pointed in some direction. Sector 1, as drawn, has an antenna boresight pointing direction 309 that results in a coverage area with very high RSSI conditions indicated by lobe 301, a coverage area with high RSSI conditions indicated by lobe 303, a coverage area with moderate RSSI conditions indicated by a region 305, and a coverage area with low, or minimal, RSSI conditions indicated by a region 307. In part, signal strength in FIG. 3 can be conveyed by line thickness, with thicker lines indicating stronger signal energy power. The omnidirectional cell with an omnidirectional transmitter, or antenna, results in a first coverage area 311 having very high RSSI conditions, a second coverage area 313 with high RSSI conditions, a third coverage area 315 with moderate RSSI conditions, and a fourth coverage area 317 with low, or minimal, RSSI conditions.

For the purposes of this disclosure, tri-sector macro cells and omnidirectional cells may be simplified to simply look like omnidirectional cells, to provide clarity of examples.

In typical cellular network design, interference and noise are important considerations. A typical network operator may have license to use frequencies in a certain geographical area, often referred to as a Cellular Geographic Service Area (CGSA). A CGSA may be small or large, and might be represented by a border line, and different operators might have license to use the same frequency in neighboring CGSAs that may share a border. Regulatory limits may be set for operators to conform to with respect to how much signal energy power they can transmit into a neighboring CGSA. For example, in the U.S., 47 C.F.R. § 22.983(a) specifies field strength limits. Field strength might be measured as a median field strength for any given CGSA at an edge of coverage with neighboring CGSAs and might be, for example 40 dBμV/m. This signal energy threshold corresponds to a power flux density (PFD) of −75.7 dBm/m$^2$, which would correspond to about −96 dBm of signal energy, or RSSI, over an undefined amount of bandwidth, at the surface for handsets with antennas with 0 dBi of gain.

Terminal equipment antennas inevitably have losses that subtract from their isotropic gain, particularly when held next to hands or heads, but LTE handsets also include at least two antennas for diversity and MIMO operation. That effectively raises the gain close to 0 dBi, so while the actual values may vary, 0 dBi can be a reasonable metric applied to a specific handset. A handset, base station, or other device in a telecommunications network might be programmed for converting from dBμV/m to dBm, such as using the values shown in FIG. 4.

As illustrated in FIG. 4, an RSSI of −96 dBm over a 5 MHz LTE block, for instance, would correspond approximately to an RSRP of −102 dBm, as the RSRP is the power across the 1.08 MHz bandwidth of reference signals and RSSI is the power across the entire 4.5 MHz of utilized bandwidth in the 5 MHz deployment. The LTE protocol allows for RSRP reporting values from the handset anywhere between −140 dBm and −40 dBm. A typical "no service" determination by a network operator might be set at an RSRP floor of −120 dBm, but other values might be used.

A network might use a regulatory threshold to define the primary area of service for a cell, which may be a higher signal energy level than the protocol limit for usable signal, or service. As such, in FIG. 3, region 305, the area of coverage described by moderate RSSI conditions, could be considered a "threshold contour" where the signal is equal to a regulatory threshold, or primary area of service threshold. This threshold contour could be lower or higher depending on whether neighboring cells are deployed by the same operator or different operators. The cell may have operable coverage as far the bounds of region 307 illustrated in FIG. 3, where the signal energy level reaches the minimum usable by the protocol. Regions 301 and 303 are areas of higher serving signal energy and thus would enjoy better quality of service and be better defended against co-channel interferers. For a given location with signal from multiple towers on the same band, channel, or resource block (and thus subject to co-channel interference), the SINR at that location might be computed by a network node as shown in Equation 2, where SINR is the signal-to-noise-plus-interference ratio of the serving signal, N is the total system noise in the signal bandwidth, and I is the sum of the signal power of co-channel interfering signals in the signal bandwidth. The SINR value might be represented as dBs.

$$SINR=RSSI-10*\log_{10}(N+I) \quad \text{(Eqn. 2)}$$

A typical mobile network operator might have hundreds of MHz of spectrum licensed to them for deployment. As a result, the cellular networks are highly heterogenous in nature; the network is comprised of layers of coverage maps where each layer represents a certain frequency, or resource block, of the deployed spectrum. As a result, intercell interference and capacity is also managed by simply layering coverage on different frequencies, or resource blocks.

There is a difference between radio interference and packet losses. Mature networks with many base stations densely deployed in congested areas and with multiple frequency blocks and bands available to provide diversity channels and handover to other frequency channels and handoffs to other base stations entirely. In telecommunications networks in the U.S. at least, the major nationwide mobile operators all have many licensed blocks of spectrum in several frequency bands, typically used with Carrier Aggregation (CA) to transport downlink data streams simultaneously through multiple frequency bands. An error on one frame's transmission on one carrier will, through Hybrid-Automatic Repeat Request (H-ARQ) signaling, be retransmitted, typically on diverse alternative channels via intraband and interband aggregation. This diversity of spectrum resources make for the robust performance of modern mobile networks even in the presence of various types of radio interference.

Modern cellular network protocols, such as 4G LTE and 5G NR, are designed well for co-channel interference and can operate at SINR levels of 0 dB or less. For instance, most modern LTE network deployments leverage a frequency reuse pattern of 1. This is unlike prior 3GPP protocols, such as GSM, which leverage GMSK modulation and require SINR of greater than 7 dB to close a link. As such, technologies such as GSM leverage frequency reuse patterns where use of certain carrier frequencies are separated by some distance represented by some number of cells away from the cell of use. Examples include 3, 5, 7, 9, etc.

For a technology like LTE, fractional frequency reuse can be implemented. This technique leverages the fact that LTE deployments are several resource blocks wide. At the cell edge, certain resource blocks will be used that are not used by any neighboring cell, and vice versa. As such, the UEs at a cell edge can avoid being interfered by and avoid interfering with the neighboring receiving base station.

FIG. 5 illustrates aspects of fractional frequency reuse. As shown there, three cells, Cell 1, Cell 2, and Cell 3, might implement a fractional frequency reuse scheme. Option A shows where Cells 1, 2, and 3 use different frequency blocks at their cell edges where coverage from their transmitter overlaps. The centers of the cells, 501, 505, and 509, leverage the same frequency block, 513. The edges of cells 1, 2, and 3; 503, 507, and 511, respectively, use frequency blocks, 519, 521, and 523, respectively. Note that each cell keeps frequency blocks open, such as 515, which are being used by the cell neighbors' cell edges are using. Option B shows where Cells 1, 2, and 3, use the entirety of the bandwidth. The cells provide coverage of cell centers, 501, 505, and 509, using frequency blocks, 525, 527, and 535, respectively, transmitted at some lower power. The cells provide coverage of cell edges, 503, 507, and 511, using frequency blocks, 531, 533, and 529, respectively, transmitted at some higher power. As a result of transmitting at higher power, the cell edge has higher SNR than the interfering signal from a neighboring tower. As a result, the LTE signal, which works down below the noise floor, can operate with sufficient SINR.

Typical cellular networks will plan tower deployments in advance and when needing to add new towers, will consider reconfiguring the existing network (in terms of frequency reuse or fractional frequency reuse plan). Other parameters can be toggled as well, such as, but not limited to, maximum timing advance, maximum CQI, maximum RSRP, etc. Certain bands can even be prioritized over others to manage capacity and interference in certain areas.

In a typical cell planning process, in which a new cell is evaluated for coverage potential and potential interference with neighboring cells and vice versa, sometimes capacity on certain bands is lost in certain geographies of the network to make room for capacity in other geographies that may be lacking coverage and thus revenue potential. When a new cell is added to the network, it is usually on a fixed structure, which cannot be moved, so the planning exercise can involve exhaustive analysis and testing before the cell is operationalized. When the new cell is operationalized, it is configured with the appropriate parameters to avoid interference with neighboring cells, and the rest of the network reconfigured accordingly (if needed to avoid interference with the newly introduced cell). Reconfigurations could include, but are not limited to, modification of the set of performance parameters, such as those illustrated in FIG. 2.

An existing cellular network typically has predominantly static base stations with static coverage and can be heuristically designed. It is quite a different matter to deal with orbital base stations on satellites in a radio access network, as they are in constant motion and provide cell coverage on the Earth in a manner that is highly dynamic. The motion of the satellites might require handoff of coverage in certain geographies so that service is not interrupted. The handling of transitioning coverage from one cell tower to another in a static geographic area is a much simpler operation. A satellite-based network of orbital base stations coexisting with a terrestrial wireless network is a simple matter if the networks operate in different bands, with different protocols, etc., but where the orbital base stations are using the same protocols as the terrestrial network, thus allowing an unmodified handset that is not specifically modified for a distinct sat-phone protocol, something else is needed. Careful design of a network of orbital base stations can offer a solution to this problem.

Orbital base stations may deploy cells using beams from antenna on a satellite. These beams may be programmed to provide cellular coverage in certain locations obviating the need for a local transmitter that may be impossible to locate terrestrially in a certain location based on local regulatory or geological limitations. Locations of virtual cells from orbital base stations, and their radius of coverage, can be modified or modulation based on feedback information regarding the appropriate deployment, such as from a capacity, interference, or otherwise situation. Where a base station is able to close a link with a mobile terminal and thus be able to communicate and pass data between the base station and the mobile terminal with sufficient reliability—such as a reliability threshold specified in a protocol specification—that situation might be considered one where the base station is able to provide service to the mobile terminal. Different levels of service might be available, such as a first level of service when there is a strong signal, a second level of service when there is a weaker signal, and a level of service considered to be "no service" when the signal and/or noise are such that reliable communication is not assumed or available.

A process for computing and evaluating impact of interference presented by an orbital cellular service augmentation network operating to provide service that might overlap with a terrestrial network is disclosed. A process for eliminating, minimize, and/or reducing risk or probability of harmful interference can be provided, such that the deployment of orbital mobile cells can augment the terrestrial network and/or its coverage map that might be provided by existing or future terrestrial cells/transmitters. The process may maximize population of coverage, and capacity provided per unit area of population density. These things may be optimized while also attempting to minimize, or constrain, satellite power use, or other resource use (data, memory, capacity, etc.).

A process for computing and evaluating three-dimensional (3D) and dynamic coverage extension of existing terrestrial mobile networks by introducing orbital, or moving, base stations is provided. These techniques could also be used for 2D mapping.

In one aspect, a network controller, which might be implemented on an orbital base station, in part on a handset, and/or in part on another device or system on the wireless network, determines which network parameters to use for various communications, such as what frequency channel, what fractional frequency reuse, etc. is to be used in an orbital base station cell that is, or is likely to be, overlapping with one or more terrestrial base station cell. The geographic size of an orbital base station cell might be much larger than a typical terrestrial base station cell, and would be moving across the surface of the Earth unlike a typical terrestrial base station cell, and as the satellite carrying the orbital base station rises on the horizon to a zenith and then sets below the opposite horizon, the shape of the orbital base station cell would be changing as the orbital base station traverses its orbit. Given the relative sizes of orbital base station cells to terrestrial base station cells, the orbital base station cell might overlap a significant number of terrestrial base station cells and thus need to deal with fractional frequency reuse upon all the overlapping terrestrial base station cells.

In one aspect, the transmission parameters for a given UE, such as its fractional frequency, timing, etc. are determined by an orbital base station and can vary based on a location of the UE in 2D or 3D and based on possible overlapping terrestrial base station cells.

Existing network planning procedures associated with deploying new radio access transmitters assume that deployments are relatively static with respect to the covered geography. As such, procedures for implementing frequency reuse patterns and fractional frequency reuse patterns, in the case of 3GPP protocols, often assume static coverage maps. Implementing cell coverage from satellite beams will come with inherent dynamics, which may require unique considerations of the network planning procedures for introducing new cells from satellite base stations.

Beams from orbital base stations might be larger in radius that typical terrestrial cell radii. As a result, there may be multiple terrestrial cells that experience coverage overlap with a single orbital base station cell. Some of these terrestrial cells may be operating on the same co-channel. Typical fractional frequency reuse schemes leverage measurements for devices at certain distances from the cell tower (based on timing advance) and assign resource blocks based on this distance away from the cell tower. For an orbital base station cell, the location of the UE can be determined within the beam. For example, the techniques taught by Speidel 1 might be used, where the Doppler Shift and propagation delay from a device within the beam can be used to compute a location of the device within the beam. In effect, with good knowledge of the satellite position itself and the computed location of the device within the beam relative to the satellite, a geolocated position for the device can be computed (a latitude, longitude, altitude point in 3D space). Based on the measured location of a device in a beam, if the location of that device is at the cell edge and within an area that overlaps with an existing cell, that device can be assigned an appropriate resource block, or frequency channel, such that it does not interfere with the existing terrestrial network.

By way of another example, satellites in LEO will be able to provide coverage of a static cell, or location, for a finite amount of time. To maintain coverage of the cell, another satellite will need to take over the cell and the UEs within the cell will need to be handed over each time a new satellite comes by to take over service. During the handover, if the satellites are using the same co-channel frequency, then there may be a dynamic fractional frequency reuse plan which obeys the moving boundary between the two satellite beams that are trading coverage of the static cell location. Furthermore, it may be important which satellite is tasked to take up service of the cell at a certain moment in time, unlike with terrestrial cell coverage planning that can assume base stations are fixed in their coverage in both the geospatial and time domain. With orbital base station coverage, the potential is also offered to provide coverage in airspace and space itself. Standard cellular planning procedures do not have to consider cellular coverage interference environments in airspace or space, or generally in more than two dimensions.

An example of an implementation will now be described.

In one embodiment, a processor computes coverage data from input data related to terrestrial networks, as might be obtained from databases supplied by terrestrial network operators. The coverage data might be used to optimize coverage from orbital base stations that might augment existing coverage from terrestrial base stations. Optimized coverage might mean, but not be limited to, minimized or reduced interference, maximized or improved quality of service, or some combination thereof. The process used by the processor might be a data-driven method that takes database inputs and various processes and/or program code to produce a database or databases of outputs that define optimal satellite beam placement of cells to augment existing terrestrial coverage.

One such database might be a transmitter database describing existing terrestrial network transmitters within an existing terrestrial network infrastructure. The transmitter database might be organized effectively as a table where each row indicates a unique cell, or transmitter in the terrestrial network. Each transmitter might be described by various parameters, including but not limited to transmitter location, transmitter antenna performance (gain, radiation pattern, etc.), transmitter band (frequency, bandwidth, etc.), transmitter direction (e.g., azimuth, mechanical down-tilt, electrical down-tilt, etc.), etc.

Another database might be a coverage database, which may be computed or provided directly, that describes existing coverage layers, perhaps by frequency, band, and/or resource block, etc.) of an existing terrestrial network infrastructure. The computation of the coverage database could be conducted using information provided about the network transmitters and an RF propagation model. Various, or multiple, propagation models could be used and might include, among possibly others, a Longley-Rice model, another model to provide an elevation map database of nearby terrain, an Okumura-Hata model, a free space path loss model, etc. The coverage database might be organized as a matrix, vector, tensor, or mesh of latitude, longitude, altitude points (in 2D or 3D) where each location in the matrix corresponds to indices in several other matrixes that include the computed signal levels associated with coverage and quality of service. There may be multiple signal level matrices associated with each point in the location matrix; the signal levels for each point could include the signal level from the serving tower of that location as well as computed signal, or interference, levels from neighboring towers on the same co-channel in that location. This signal levels might be computed for each band deployed in a given network. There may be separate signal level matrices for different mobile operators in the same geography that operate competing networks. There may also be an evaluation of environmental noise at each location, using some environmental noise model (e.g., AWGN) or direct field measurement.

Additionally, the coverage database may have values usable to compute signal-to-noise-plus-interference ratios (SINRs) of the serving signal in a given band (e.g., which may or may not be highest signal in a given frequency bandwidth at that location). So, for instance, there may be four signal level matrixes (e.g., serving cell signal, co-channel interference signal level, environmental noise, and SINR) for each band deployed in a network that correspond to each latitude, longitude, altitude point. So, if a network deployed five bands, there might be 20 matrixes describing the three-dimensional coverage map of that operator. And if there were a second operator in the area deploying six bands, there might be another 24 matrices describing the three-dimensional coverage map of the second operator.

For each given location there may be a matrix, or matrixes, stored in computer-readable memory that a network node is programmed to process and those matrixes can describe prioritization of which band to use in that location, in the event that a location has a viable serving signal from multiple bands. The least prioritized bands, typically associated with coverage layers deployed by macro-cells, might represent the last band to be subject to harmful interference, or perhaps a slight capacity reduction, from a potential co-channel interferer that is deployed by a neighboring terrestrial base station or orbital base station. The interference risk on a given band in a given location may therefore be parameterized as some weighted score based on a combination of a band's prioritization, and the quality of signal available by other bands in that same location that have higher (or lower) prioritization. If information were available about the peak to average capacity use on each cell in the terrestrial network, that could also be used to weight the parameterized interference risk variable.

Other input databases might be used in the computations, such as a license boundary database that describes important license boundaries as vectors of latitude/longitude points with corresponding metadata (e.g., bands licensed in within these boundaries organized by operator). License boundaries may include international boundaries, state level boundaries, province level boundaries, county level boundaries, or some other geographically important boundaries. A boundary database might even include unlicensed boundaries, such as international water boundaries or EEZ boundaries, where use of frequencies are currently unlicensed, or unregulated.

A quality-of-service database might be used that describes quality of service requirements across the matrix, or mesh, of points described in one or more of the above-described databases. The quality-of-service requirements across the matrix might be defined as minimum SINR and maximum SINR acceptable values, and thus represent minimum and maximum levels of interference as well as minimum or maximum levels of serving signals in those locations. The quality-of-service database might serve as an input to guide an optimization program to evaluate beam cells deployed by a satellite, where the beams deployed by a satellite are optimized to meet the quality-of-service requirements or optimize across the quality-of-service requirements.

A location/performance database might also be an input, wherein the location/performance database describes location and performance of orbital base stations. This might include orbit ephemeris, perhaps represented as a mesh of potential locations at latitudes, longitudes, and altitudes, above the surface of the earth. The location of the satellites may be represented temporally where past, present, and future locations are represented and account for the physics of the satellites' motion. Satellite antenna and front-end performance (frequency capability, bandwidth capability, antenna gains, radiation patterns, steerability, etc.) might also be included in the database.

There might be other input databases, similar or different from those described above, that could be used to both characterize existing coverage as well as characterize the ability of the satellite to provide service from orbit. The method for optimization may take the form of an algorithm or series of algorithms executed perhaps by program code processed by the processor that uses the input databases as information to evaluate optimal beam locations from servicing orbital base stations.

One method might implement a beam simulation algorithm wherein satellite beams of certain performance parameters (e.g., gain, steering coefficients, frequencies, etc.) can be evaluated for their projected contours on the surface of the Earth based on to their location in orbit relative to some desired center location of a given steered, or non-steered, beam.

Another method might evaluate the coverage provided by an existing terrestrial network (in 2D or 3D space) and evaluate the resulting interference and increase in coverage of the terrestrial network based on a beam from a satellite placed down at a given location. The beams from the satellite may be configurable to various transmit powers, resulting in increasing or decreasing signal energy contours on the surface of the Earth, or at certain altitudes above the surface of the Earth (to consider coverage for receivers on high altitude platforms such as balloons, airplanes, drones, etc.). The method might evaluate service contours from a satellite beam at varying locations in orbit, at varying transmit powers, and do this across a series of potential center cell locations across the mesh describing finite points within a given geography (which may be a county, state, province, continent, ocean, or the world as a whole). The method might include evaluating performance across a series of bands that might be deployed by a given satellite or set of satellites in a set of orbits.

The processor might perform random-sampling simulation, such as a Monte Carlo simulation, to determine possible ideal locations and radii of service for cells implemented from orbit to deploy an orbital cellular service around a given geography. The locations might be selected by taking into account the size of the cell, a desired quality of service, interference conditions, etc.

Once there are determined, optimized, cell locations to be covered by the orbital network, each cell will be assigned required fractional frequency reuse patterns to accommodate overlap with the existing terrestrial coverage on the same frequencies being used by the orbital base station. An example of this procedure is illustrated in FIG. 6.

Figure 6:
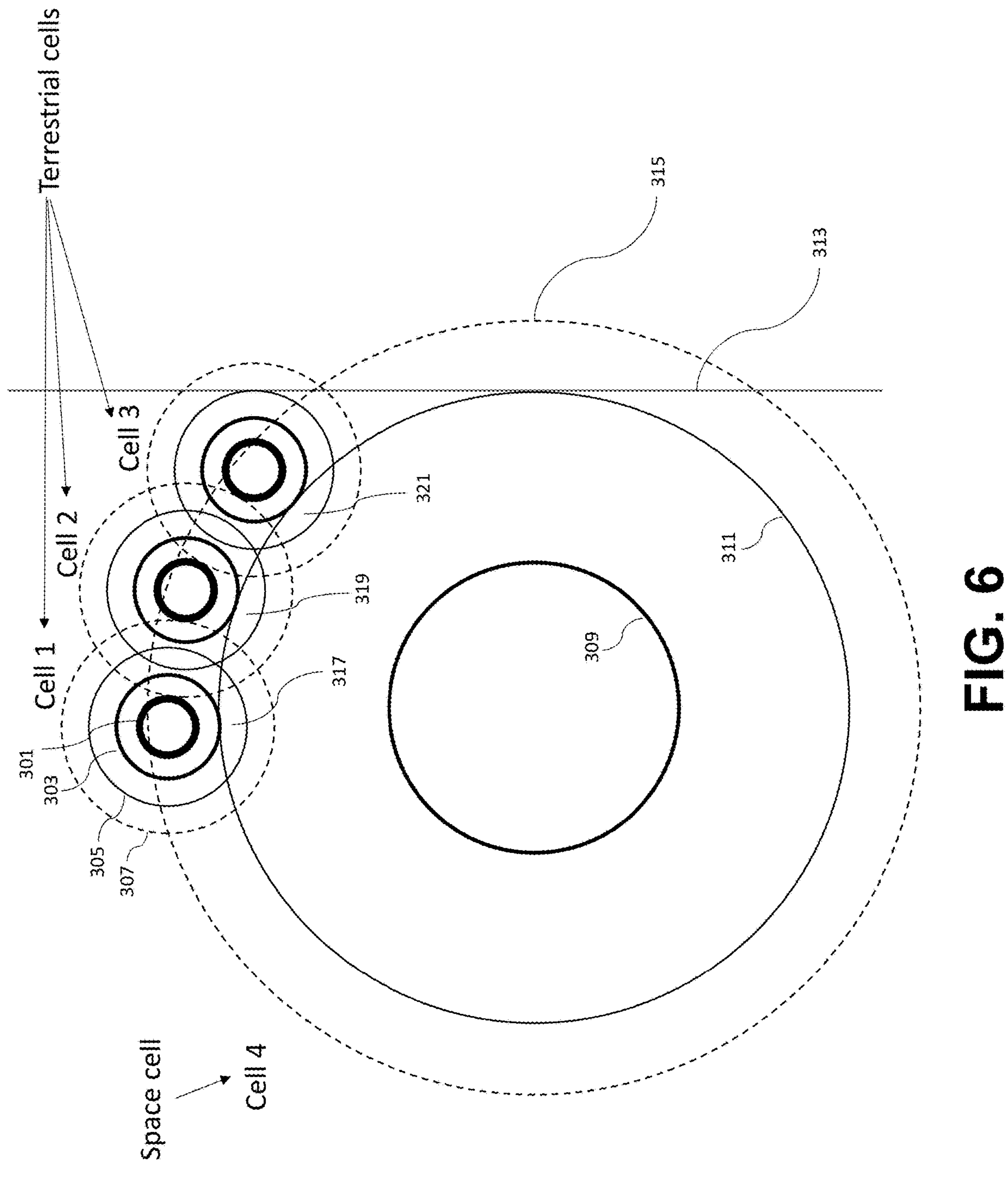
FIG. 6 illustrates a cell layout.

FIG. 6 illustrates four cells. These four cells may be terrestrial cells or orbital cells, but for the purpose of explanation of FIG. 6, Cell 1, Cell 2, and Cell 3 are terrestrial cells, and Cell 4 is an orbital cell. The existing terrestrial cells may have coverage areas such as a first area 601 having a very high SNR, a second area 603 having a high SNR, a third area 605 having a modest SNR, and a fourth area 607 having what is considered no signal. Similarly, the orbital cell may have a first coverage area 609 that is described by high SNR, a second coverage area 611 having a modest SNR, and a third coverage area 615 having what is considered no signal. In this drawing, the second coverage area 611 having the modest SNR may be consistent with the regulatory threshold for neighboring CGSAs, where it cannot exceed this value over a CGSA border 613. Since the orbital base station can use Doppler and delay measurements from signals received from the UEs within its coverage area, it can compute where the UE is operating within the cell. If the location of the UE within the cell is within an area that overlaps with a terrestrial cell coverage, the orbital base station will allocate frequency blocks to those UEs consistent with the fractional frequency reuse plan, or frequency reuse plan, of the terrestrial cell. The orbital base station can allocate a distinct fractional frequency reuse pattern for each of locations 617, 619, and 621 where Cell 4 overlaps Cell 1, Cell 2, and Cell 3, respectively. While a typical terrestrial cell only allocates frequency patterns based on distance (or signal strength), an orbital base station can allocate frequency patterns based on distance and direction (and altitude if needed) from a cell center, which is more likely to be needed in the case of rapidly moving cell footprints.

FIG. 6 illustrates a beam contour of an orbital base station when directed at nadir (i.e., from directly above the cell center). As such, the target cell radius would be described by a regulatory threshold contour 611.

Depending on cell size, there might be certain orbital base stations that are constrained to provide coverage to a certain cell. Any number of orbital base stations, with any number of designs, might provide service to any number of cells, of any number of radiuses. With the cell location determined, and the required fractional frequency reuse, or frequency reuse pattern, determined, a method for determining how to provide coverage of the cell during a satellite overpass may be implemented.

Figure 7:
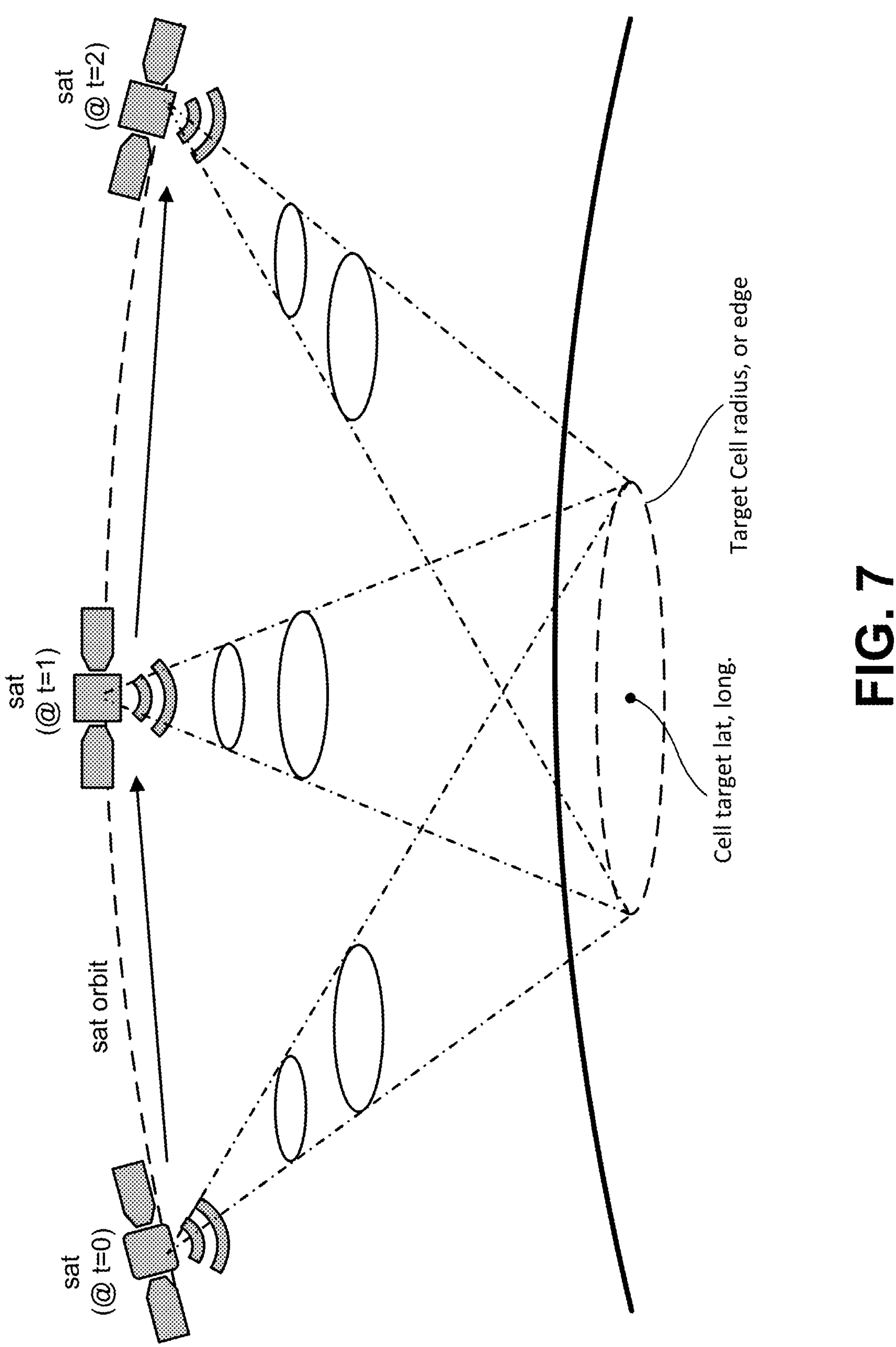
FIG. 7 illustrates physics of a satellite overpass of a cell.

FIG. 7 illustrates physics of a satellite overpass of a cell. Each satellite will move from the position on the left at t=0, to the right to the position in the middle at t=1, and to the right again to the position on the right at t=2. During the overpass, at each time step, a satellite will point, or steer, a beam toward the cell center latitude, longitude position point and modulate the transmit power to provide coverage of the area described by the target cell radius, or edge.

Figure 8:
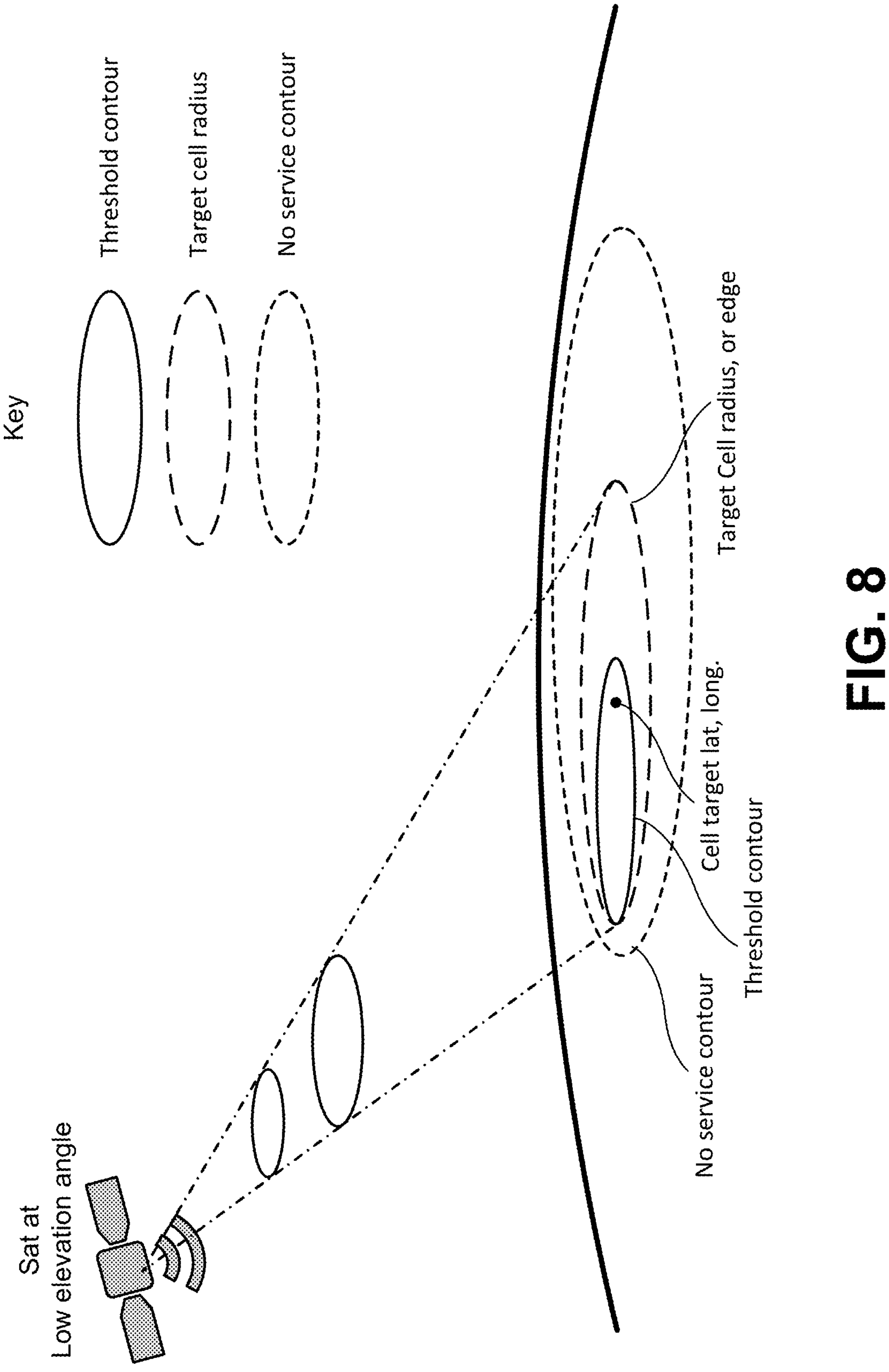
FIG. 8 illustrates an orbital base station at a low elevation angle and an oblong coverage area.

FIG. 8 illustrates how an orbital base station at a low elevation angle will have an oblong coverage area, which might be steered to provide a threshold contour that covers a portion of the cell, and does not exceed the target cell radius, or edge. The beam may have a "no service" contour, outside which there is presumed to be no service, which may extend past the target cell radius, or edge.

Figure 9:
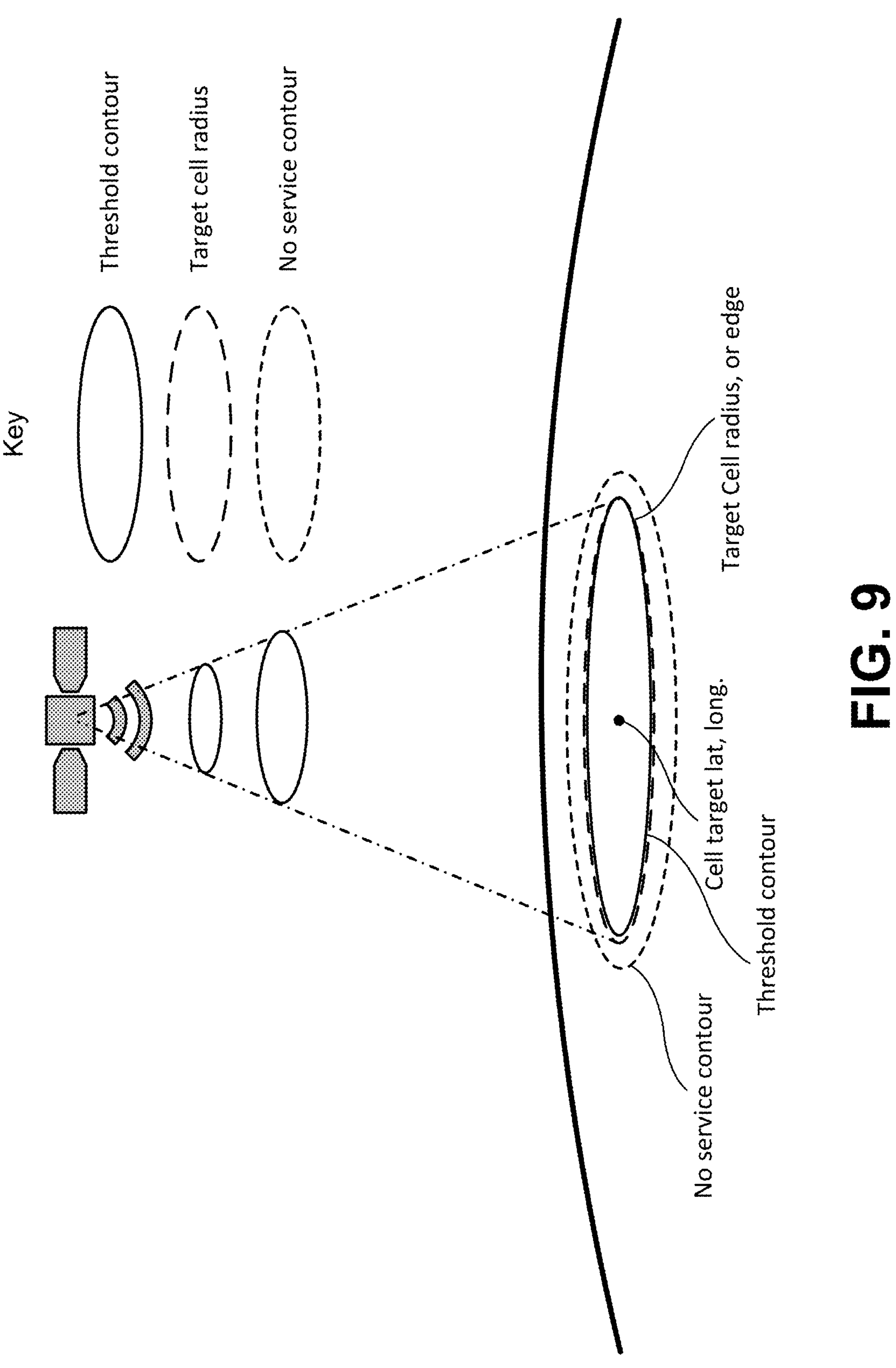
FIG. 9 illustrates an orbital base station at a peak elevation angle and a circularized coverage area.

FIG. 9 illustrates how an orbital base station at a peak elevation angle with have a circularized coverage area, which might be steered to provide a threshold contour that covers the entirety of the cell, and does not exceed the target cell radius, or edge. The beam may have a "no service" contour outside which there is no service, which may extend past the target cell radius, or edge.

Figure 10:
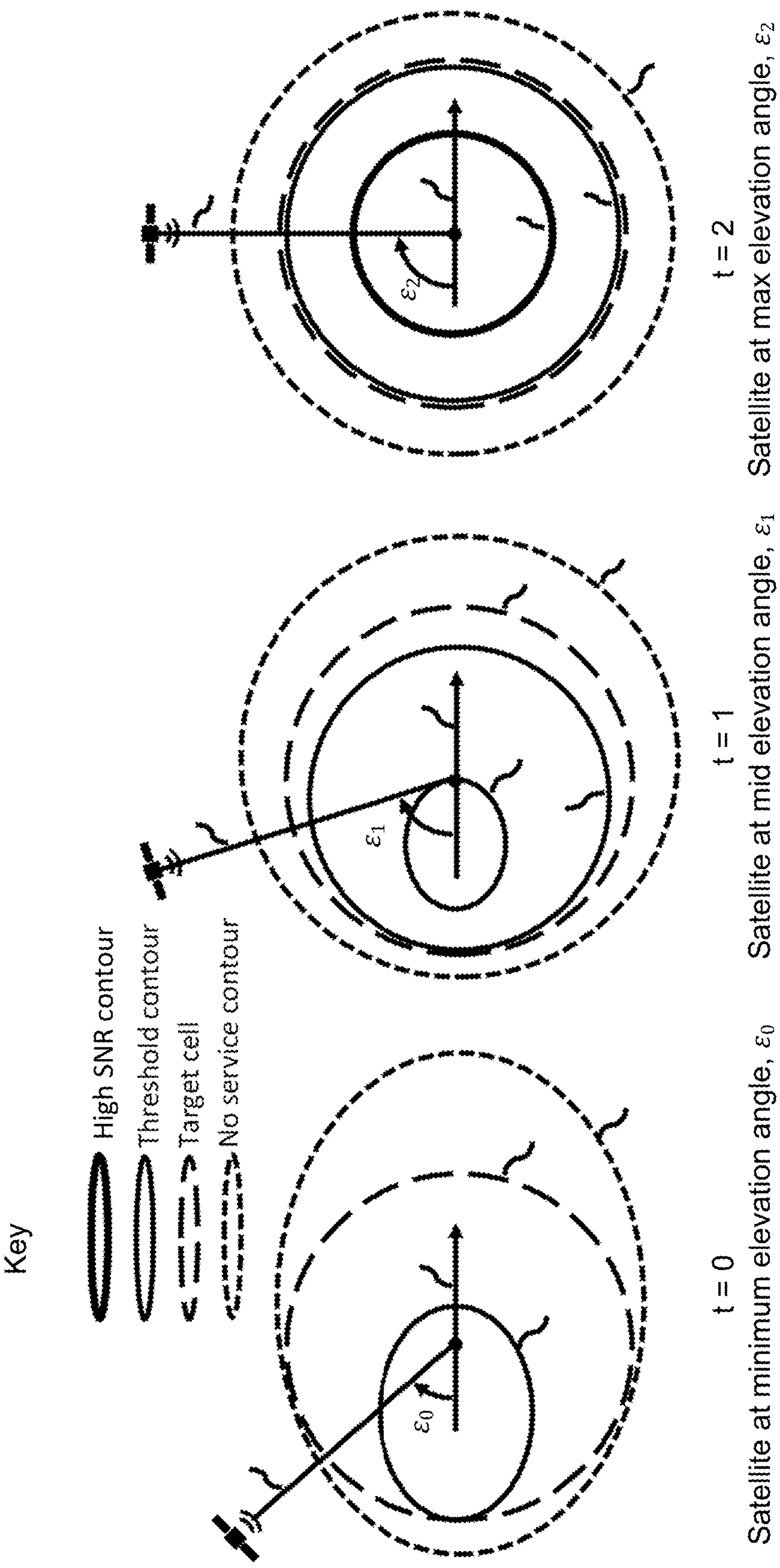
FIG. 10 illustrates an orbital base station transitioning among elevation angles.

FIG. 10 illustrates how an orbital base station may transition from a minimum elevation angle to a medium elevation angle and then to a maximum elevation angle during the first half of a satellite overpass. The satellite would also transition from the maximum elevation angle back down through the medium elevation angle to the minimum elevation angle, but that is not drawn in FIG. 10 for simplicity. During the overpass, the satellite at t0 may steer a beam to place a threshold contour that fills out a portion of the cell and does not exceed the target cell boundary. There may be a "no service" contour that exceeds the target cell boundary. The satellite at t1 may steer a beam at a smaller angle away from nadir to place a high SNR contour within a portion of the cell while filling in a larger portion of the cell with a threshold contour that still does not exceed the target cell boundary. The satellite at t2 may steer a beam at an even smaller angle away from nadir to place a larger high SNR contour within a portion of the cell while filling out the entire target cell boundary with a threshold contour, that still does not exceed the target cell boundary.

To transition a target cell from one satellite to another, as one satellite sets, another satellite might begin providing simultaneous coverage of another portion of the cell. As such, the transition can be predicted based on orbital mechanics. Based on the relative locations of the satellites, the method may compute an ideal start time, middle time, and end time for the handover. The satellites need not be in the same plane, but should have the ability to conduct the handover between the satellites, either through the ground network below, or through intersatellite links, or some combination of both. The latency on the handover link can be predicted in advance as the satellite network will also be able to predict the route for the handover through the network and the corresponding delay.

Figure 11:
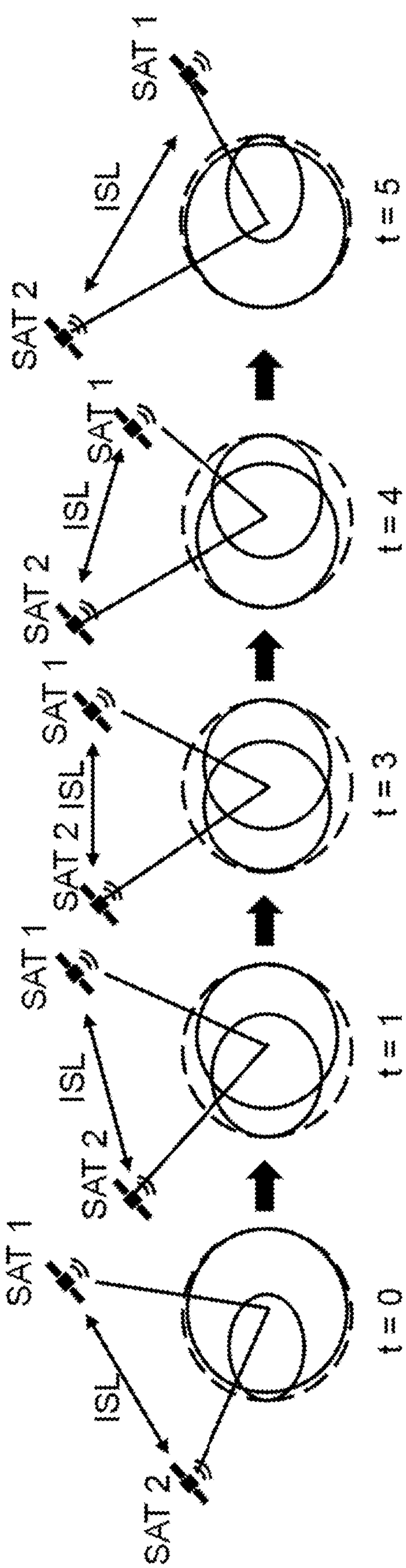
FIG. 11 illustrates adjacent satellites in an orbit with an intersatellite link between them.

This concept is illustrated in FIG. 11. The illustrated example is simplified to show satellites in the same plane that might be adjacent to each other in the plane with an intersatellite link between them. At t=0, satellite 1 may be at a higher elevation angle than satellite 2, as a result, satellite 2's threshold contour is larger than satellite 1's, but together they both do not exceed the target cell boundary edge. During the entire overpass, both satellites conform their threshold contours not to exceed the cell boundary edge. However, satellite 1 begins to drop in elevation angle, satellite 2 begins to rise in elevation angle, where satellite 1 begins to reduce its threshold contour coverage area of the cell and satellite 2 begins to increase its threshold contour coverage area of the cell. At the middle point of the handover, at t=3, each satellite may be at similar, or equal elevation angle, and as such, each provide coverage of half of the cell. As the satellites continue in flight to t=4 and t=5, satellite 1 sees further reduction of its threshold contour eventually disappearing, while satellite 2 sees further increase in its threshold contour. At some point past t=5, satellite 2 will eventually either entirely, or near entirely, fill the target cell boundary with a threshold contour.

The overlap of the threshold contours during this handover is an improvement over the way that co-channel cells in the terrestrial network overlap. The overlap of the contours or orbital base stations can be predicted as a function of time, and as such, the respective areas in the target cell where an orbital base station on each satellite is providing coverage. The edge of this coverage can be computed based on SINR for each satellite beam, or coverage area. During the overpass, therefore, a section, or band of the target cell can be treated as a handover area. This handover area would be dynamic over the course of the overpass and be shaped like a contour line, or band, where the SINR of each orbital base station involved in the handover is sufficiently small to begin a handover to the orbital base station that is taking over the target cell coverage area. In the LTE protocol, handovers can be forced by the eNB or can be requested by the UE itself. Since the network knows the future state of the cell coverage signals from each orbital base station, the eNB on the satellites may be programmed to begin the handover process as a forced procedure on the UE (per the protocol).

During the transition, the orbital base stations would continue to conform to the fractional frequency reuse scheme required by neighboring terrestrial cells. In addition to this fractional frequency reuse scheme for terrestrial cells, the orbital base stations may implement an additional fractional frequency reuse scheme at the dynamic handover line, or handover area, that moves within the cell as the orbital base stations transition coverage.

Figure 12:
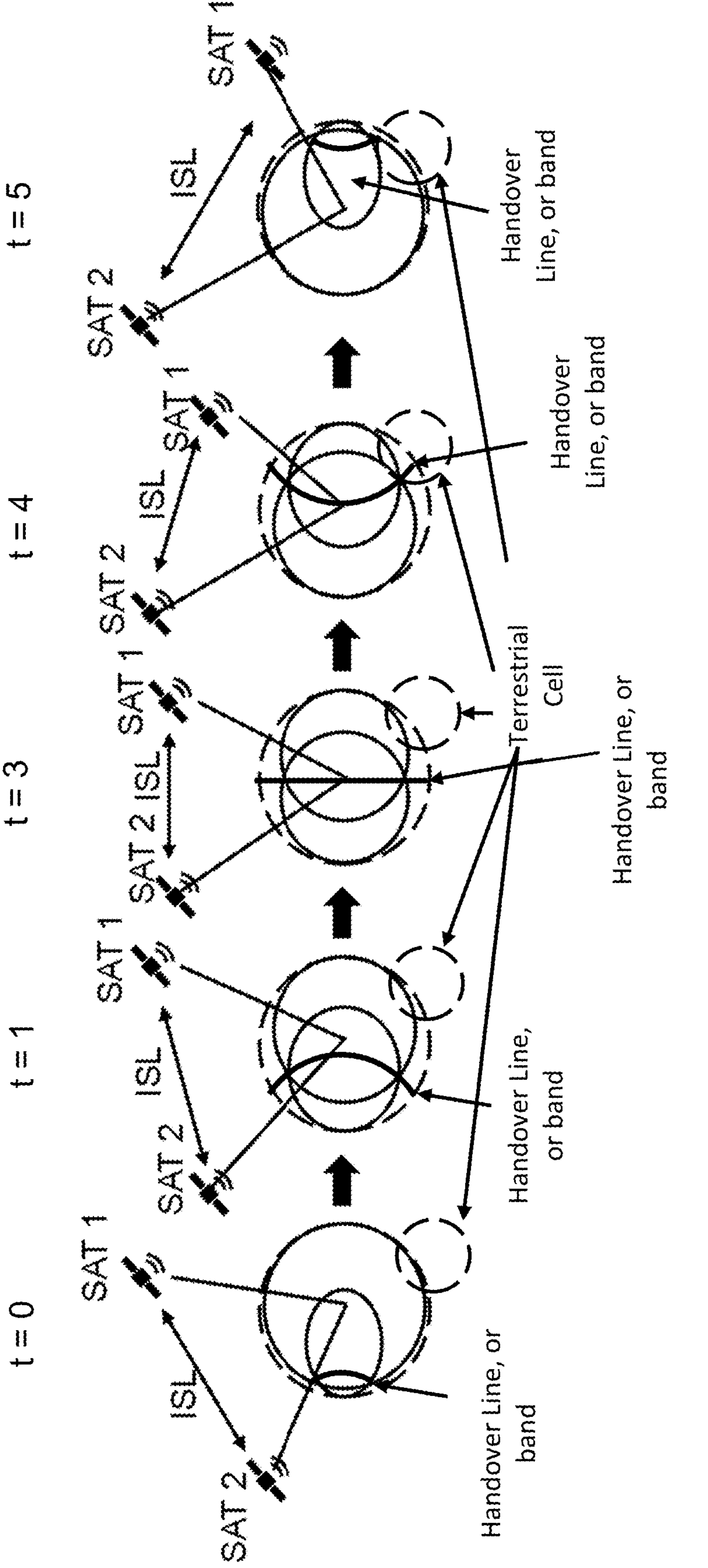
FIG. 12 illustrates a handover among orbital base stations on satellites passing over a region of user equipment (UE).

This is illustrated in FIG. 12. As satellite 1 transitions coverage of the target cell to satellite 1, a handover line or band can be computed, for which a fractional frequency reuse scheme, or frequency reuse scheme, can be implemented. On and around the handover line, or band, the orbital base stations will split, or prorate, the portions of frequencies, or frequency blocks used in those locations of the cell. In other words, the orbital base station of satellite 1 will understand to use certain frequencies around the handover line, and the orbital base station of satellite 2 will use other frequencies. Once a UE, which can be located within the cell gets close to or reaches the handover line, the handover procedure may begin from satellite 1 to satellite 2 on the frequency blocks used by satellite 2 near the handover line. During this transition, the orbital base stations will obey the fractional frequency reuse scheme required by the neighboring terrestrial cell. Of particular note is t=4 where satellite 1 and satellite 2 will have less resource blocks, or frequency resources, to split along the handover line to make the transition.

Data structures might be present in memory or storage accessible to computer processors. In some embodiments, the data structures are used by various components and tools, some of which are described in more detail herein. The data structures and program code used to operate on the data structures may be provided and/or carried by a transitory computer readable medium, e.g., a transmission medium such as in the form of a signal transmitted over a network.

Figure 13:
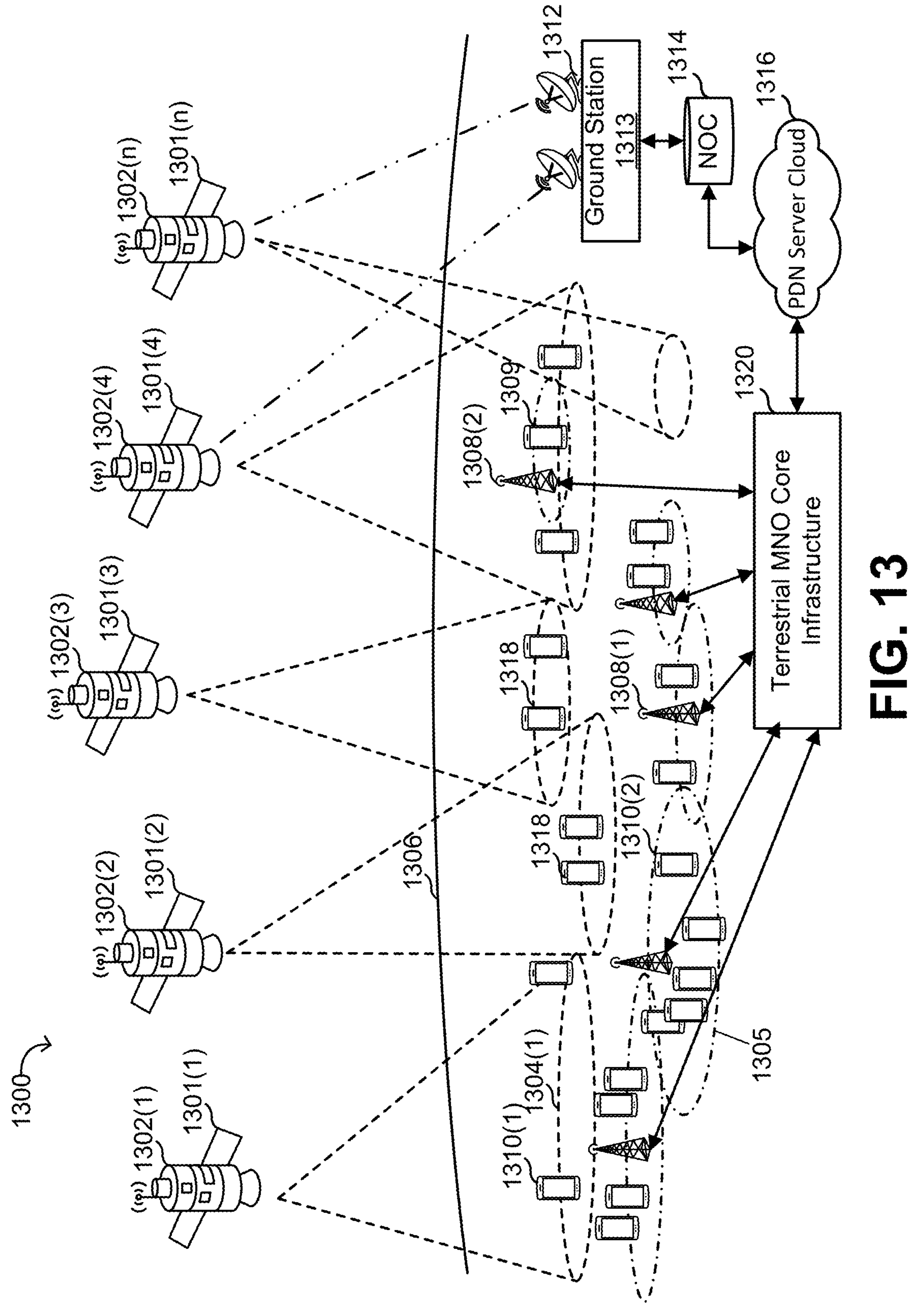
FIG. 13 is a diagram of the mobile satellite network architecture over which UEs might connect with terrestrial base stations or orbital base stations according to various embodiments.

FIG. 13 is a diagram of the mobile satellite network architecture over which UEs 1310 might connect with either a terrestrial base station 1308 or an orbital base station 1302 located on a satellite 1301 according to various embodiments. Orbital base stations 1302 might provide cellular radio service to existing mobile phones as described in Speidel I that are able to operate with the radio spectrum frequencies used in traditional terrestrial cellular networks. As a result, a satellite 1301 equipped with a cellular base station 1302 capable of tuning to and measuring the signal strength in the same frequency bands as those used by terrestrial networks can be useful. With a conventional mobile base station architecture, the satellite's base station 1302 would be inherently capable of receiving and measuring the signal strength of uplink traffic from user terminals such as cellular handsets and other UEs 1310 on the ground 1306.

Data transmissions might be for sending messages from a ground station 1313, to a satellite 1301, and then having the satellite 1301 forward the message to a UE 1310 using protocols for which the UE 1310 is programmed or configured. For example, the satellite 1301 might send a transmission using a protocol that a standard smartphone 1310 could receive. Terrestrial mobile network operator (MNO) core infrastructure 1320 might manage interactions with a public data network (PDN) server cloud 1316, a Network Operations Center (NOC) 1314, or one or more ground station transceiver systems 1312.

In some embodiments, ground station 1313 may provide a backhaul network for connecting to various network infrastructure such as the terrestrial MNO core infrastructure 1320. In other embodiments, one or more non-terrestrial base stations may be capable of communicating directly with UEs 1310, whether or not base stations are in communication with ground station 1313. In the example shown in FIG. 13, the Earth's horizon 1306 may block communications, and/or the radios used for communication may have a limited range, such that for example satellites 1301(4) and 1301(*n*) are each in communication with at least one ground station transceiver system 1312 of ground station 1313, whereas satellites 1301(1), 1301(2), and 1301(3) are not in communication with ground station 1313. In such cases, one or more satellites 1301 may serve as communication relays, such that a satellite 1301 may communicate indirectly with ground station 1313 through the one or more relay satellites 1301.

A terrestrial network 1340, such as a conventional cellular network, may include one or more terrestrial base stations

1308, at least one of which includes a radio for data communications with a UE 1310. Example terrestrial base stations may include permanent cell towers, temporary cell towers, or mobile base stations such as a cell on wheels (COW), e.g., a base station that can be deployed to replace or introduce a cell site as part of a restoration effort or to handle additional demand such as at a convention or festival or other unusually high demand event. The terrestrial network may also include one or more UEs 1310, at least one of which includes a radio for cellular communication that is programmed according to a protocol for communication with the terrestrial base stations 1308. The terrestrial network may thereby facilitate communication between one UE 1310 and another UE 1310, or between a UE 1310 and a remote server (e.g., of the public data network server cloud 1316).

Some UEs 1310 may be located within the communications range 1305 of a functional terrestrial base station 1308, and may thus communicate normally with the terrestrial network. However, during a partial or complete network outage, some UEs 1310 may be located in a geographic area or footprint 1304 that is outside the communications range 1305 of any functional terrestrial base station 1308, but that is serviceable by an orbital base station 1302 of a satellite 1301. In such cases, the UEs 1310 may communicate with the non-terrestrial base station in the same manner (e.g., using the same protocols and signal strength) as they would normally use to communicate with a terrestrial base station 1308. Some UEs 1309, otherwise comparable to UEs 1308, may be located within the communications range 1305 of a functioning terrestrial base station 1308, but may also be within the geographic area or footprint 1304 serviced by the orbital base station 1302 of a satellite 1301. In such instances, the terminal or handset may communicate with either the orbital base station 1302 or the terrestrial base station 1308. This may be useful for example in cases where the UE 1309 is near the edge of the communications range 1305 of the terrestrial base station 1308, and/or when communication with the terrestrial base station 1308 can only be established intermittently (e.g., due to terrain interference, power disruptions, etc.). In other cases, a UE 1308 or UE 1309 can be located within a coverage area of multiple base stations, including some terrestrial base stations and some orbital base stations.

Figure 14:
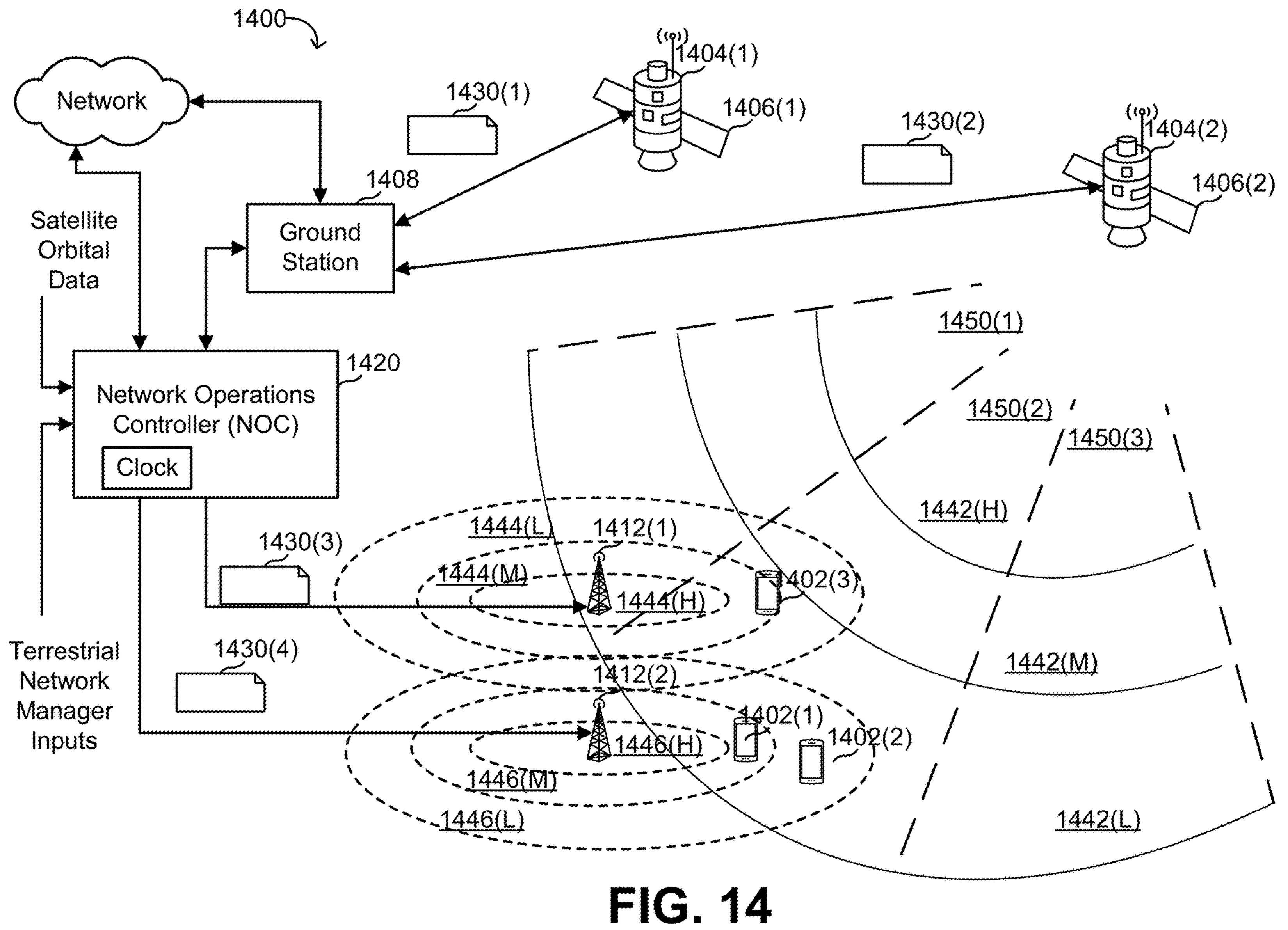
FIG. 14 illustrates an example of coverage overlap from orbital base stations and terrestrial base stations.

FIG. 14 illustrates an example 1400 of coverage overlap from orbital base stations and terrestrial base stations. As illustrated there, a plurality of UEs 1402, such as smartphones, Internet of Things (IoT) devices, cellular-enabled electronics, and the like, might be distributed over a large geographic and/or spatial space such that different UEs 1402 would find connectivity via different base stations.

As shown, there are two orbital base stations 1404. A satellite 1406(1) might house an orbital base station 1404(1) and support antennas, solar panels, propulsion systems, a communication link with a ground station 1408, and other hardware, firmware, and/or software components needed operate and support orbital base station 1404(1) and other functionality of satellite 1406(1). Likewise, a satellite 1406 (2) might house an orbital base station 1404(2) and support antennas, solar panels, propulsion systems, a communication link with ground station 1408, and other hardware, firmware, and/or software components needed operate and support orbital base station 1404(2) and other functionality of satellite 1406(2).

As shown in FIG. 14, there are also two terrestrial base stations 1412(1), 1412(2), which might be implemented by conventional cellular telecommunications towers. While only to orbital base stations and to terrestrial base stations are shown, it should be understood that in a typical production environment, there will be more than two orbital base stations, more than two terrestrial base stations, and a number of orbital base stations would not necessarily be the same as the number of terrestrial base stations.

Ground station 1408 can communicate with a network operations controller 1420 and ground station 1408 can communicate over other networks not shown, such as the Internet and cellular telecommunications networks. Network operations controller 1420 can also communicate over similar networks and as shown, network operations controller 1420 can receive inputs related to terrestrial network management, inputs related to satellite orbital data, and has an internal clock 1422 that might be used to determine a current orbital location of a satellite given the satellite orbital data and a current time. Given its ability to communicate with satellites 1406 and terrestrial base stations 1412, network operations controller 1420 can send a network parameter set messages to base stations, whether orbital base stations or terrestrial base stations. A network parameter set message 1430(1) is shown being sent to orbital base station 1404(1), while network parameter set message 1430(2) is shown being sent to orbital base station 1404(2), network parameter set message 1430(3) is shown being sent to terrestrial base station 1412(1), and network parameter set message 1430(4) is shown being sent to terrestrial base station 1412(2).

The contents of a network parameter set message might include values for various parameters in the network parameter set such as instructions for a base station as to which frequency blocks to use for which portions of its coverage area, what thresholds to consider for boundaries of different portions of its coverage area, a set of performance parameters, and other values. Collectively, various network parameter sets might define a frequency reuse plan. In a portion of a telecommunications network where the base stations are largely static, such as one that is not using orbital base stations or during a period of time when an orbital base station is not available in a static base station's coverage area, network parameter set messages 1430(3) and 1430(4) can be sent infrequently and the corresponding base stations might have a fairly static frequency reuse plan, possibly updated as new base stations are brought online. Even in the case where orbital base stations are present, the terrestrial base station's frequency reuse plans might remain constant in the frequency reuse plans of the orbital base stations configured appropriately.

As illustrated in FIG. 14, each base station has a coverage area that is divided into subregions. For example, orbital base station 1404(2) has the coverage area bounded by line 1440 and within the coverage area are subregions 1442(*h*), 1442(*m*) and 1442(1) with subregion 1442(*h*) deemed to have a high signal strength, subregion 1442(*m*) deemed to have a moderate signal strength, subregion 1442(1) deemed to have a weak signal strength, and an area outside lying 1440 deemed to be an area of no signal. In the case of various base stations, the illustrated coverage area might correspond to a footprint of coverage on the Earth's surface but also can be defined as a three-dimensional space. The actual or estimated signal strength within the subregion might be determined by experiment, by estimation, by processing of signals from UEs in those subregions, or by other methods. Likewise, boundaries of coverage areas in subregions might be determined by experiment, by estimation, by processing signals from UEs, or by other methods. The borders of the coverage areas and subregions might be determined locally on the base station or might be determined elsewhere, computed remotely.

Orbital base station 1404(1) might also have a coverage area and subregions, which are not shown while terrestrial base station 1412(1) has a coverage area with subregions 1444(*h*), 1444(*m*), and 1444(1), and terrestrial base station 1412(2) has a coverage area with subregions 1446(*h*), 1446(*m*), and 1446(1). As shown in FIG. 14, subregion 1446(*m*) overlaps with subregion 1442(1). Of course, since the subregion 1442(1) is the subregion of orbital base station 1404(1), that overlapping will only be for a short window of time as orbital base station 1404(1) travels along with orbital path. Nonetheless, since network operations controller 1420 is aware of a current time and has satellite orbital data, as well as terrestrial network manager inputs, network operations controller 1420 can assign the appropriate frequencies to use within each of the subregions to reduce or eliminate interference.

FIG. 14 illustrates several UEs 1402. A particular UE 1402(1) is located within subregion 1446(1) of terrestrial base station 1412(2) as well as subregion 1444(1) of orbital base station 1404(2) and would connect to a telecommunications network by cellular protocol communications with either the terrestrial base station 1412(2) or orbital base station 1404(2), typically depending on which is providing a stronger signal. A proxy for the strength of signal might be a distance of UE 1402(1) from throughout terrestrial base station 1412(2). As explained herein, orbital base station 1404(2) will have determined a distance to UE 1402(1) as well as a direction to UE 1402(1). Knowing the direction to UE 1402(1), orbital base station 1404(2) can subdivide its subregions into different segments and use different frequencies, different fractional frequencies, or other network parameters in different segments such as segments 1450(1), 1450(2), and 1450(3). Note that UE 1402(2) is in segment 1450(3) and subregion 1446(1) while UE 1402(3) is in segment 1450(2) and subregion 1444(*m*). To allow for frequency reuse and reducing network interference, orbital base station 1404(2) can use different frequencies in different segments of its subregions. The particular frequencies used might be conveyed by network operations controller 1420.

Figure 15:
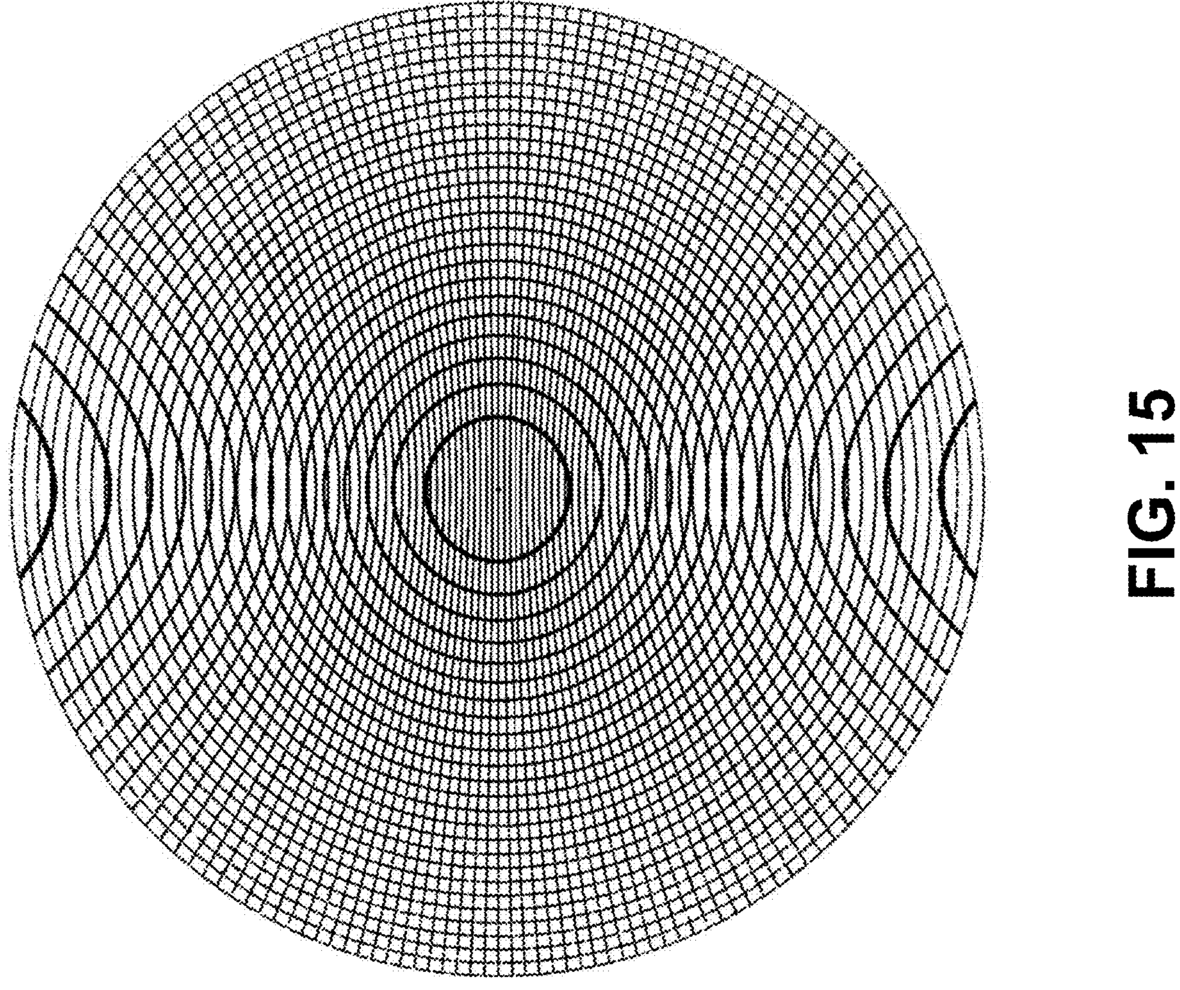
FIG. 15 illustrates an example of a division of an orbital base station's coverage area into fine segments.

FIG. 15 illustrates an example of a division of an orbital base station's coverage area into fine segments such as intersections of Doppler shift and delay contours associated with the air interface link. An orbital base station can geolocate a UE within one of the fine segments and perform a handshake or other operation to agree on network parameters, such as fractional frequencies, to use with that UE based on which segment it is found in.

According to some embodiments, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

One embodiment might include a carrier medium carrying data that includes data having been processed by the methods described herein. The carrier medium can comprise any medium suitable for carrying the data, including a storage medium, e.g., solid-state memory, an optical disk or a magnetic disk, or a transient medium, e.g., a signal carrying the data such as a signal transmitted over a network, a digital signal, a radio frequency signal, an acoustic signal, an optical signal or an electrical signal.

The term "storage media" as used herein refers to any non-transitory media that store data and/or instructions that cause a machine to operation in a specific fashion. Such storage media may include non-volatile media and/or volatile media. Storage media is distinct from but may be used in conjunction with transmission media. Transmission media participates in transferring information between storage media. For example, transmission media includes coaxial cables, copper wire, and fiber optics. Transmission media can also take the form of acoustic or light waves, such as those generated during radio-wave and infra-red data communications. Various forms of media may be involved in carrying one or more sequences of one or more instructions to a processor for execution and/or transmission. For example, the instructions may initially be carried on a magnetic disk or solid-state drive of a remote computer. The remote computer can load the instructions into its dynamic memory and send the instructions over a network connection.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In some embodiments, one or more elements might be present, such as in the following clauses:

1. A method for coordinating network services in a communication network used by mobile terminals to communicate via base stations using a protocol supported by the mobile terminals for communications with a terrestrial base stations and orbital base stations, the method comprising:

determining a first terrestrial coverage area over which a first terrestrial base station is able to close a link with mobile terminals that are within the first terrestrial coverage area;

determining a second terrestrial coverage area over which a first orbital base station is able to close a link with mobile terminals that are within the second terrestrial coverage area;

determining an overlap area between the first terrestrial coverage area and the second terrestrial coverage area;

determining a first network parameter set for use at least in in the overlap area for communications with the first terrestrial base station;

determining a second network parameter set for use at least in in the overlap area for communications with the first orbital base station, wherein at least a portion of the first network parameter set and/or a portion of the second network parameter set are specified to avoid or reduce interference between simultaneous communications in the overlap area with the first terrestrial base station and with the first orbital base station;

conveying a first network parameter set message to the first terrestrial base station wherein the first network parameter set message includes a representation of the first network parameter set; and conveying a second network parameter set message to the first orbital base station wherein the second network parameter set message includes a representation of the second network parameter set.

2. The method of clause 1, wherein the first network parameter set includes a first specification of which frequency blocks of a plurality of frequency blocks usable according to the protocol that the first terrestrial base station is to use for communications with mobile terminals found to be located in the overlap area and the second network parameter set includes a second specification of which frequency blocks of the plurality of frequency blocks that the first orbital base station is to use for communications with mobile terminals found to be located in the overlap area.

3. The method of clause 1 or clause 2, wherein the plurality of frequency blocks is allocated among a plurality of terrestrial base stations and a plurality of orbital base stations based at least upon static locations of the plurality of terrestrial base stations and a current time location of the plurality of orbital base stations to reduce or eliminate multiple use of a given frequency block by multiple base stations that have overlapping coverage areas.

4. The method of any one or more of clauses 1 to 3, wherein the overlap area is determined by measurement of signal strength of signals from base stations at a mobile terminal location.

5. The method of any one or more of clauses 1 to 4, wherein network parameter sets are assigned to base stations wherein at least one base station has a coverage area comprising a plurality of subregions with each subregion corresponding to a portion of the coverage area that meets a set of performance parameters.

6. The method of clause 5, wherein the set of performance parameters for a subregion corresponds to signal strength within the subregion.

7. The method of clause 5 or clause 6, further comprising determining an actual or estimated signal strength within subregions of the plurality of subregions, determined by experiment, by estimation, and/or by processing of signals from mobile terminals in the subregions.

8. The method of any one or more of clauses 1 to 7, wherein the first terrestrial coverage area and the second terrestrial coverage area are defined within a footprint of coverage on the Earth's surface.

9. The method of any one or more of clauses 1 to 8, wherein at least the second terrestrial coverage area is defined within a three-dimensional space.

10. The method of any one or more of clauses 1 to 9, wherein determining the second terrestrial coverage area comprises:

initiating communications between the first orbital base station and a particular mobile terminal;

determining, from the communications, a distance between the first orbital base station and the particular mobile terminal;

determining, from the communications, a direction of the particular mobile terminal relative to the first orbital base station; and determining a containing area of the particular mobile terminal based on a determined location of the particular mobile terminal, whereby a set of network parameters specific to the containing area are allocated for use by the first orbital base station.

11. The method of clause 10, wherein the determined location of the particular mobile terminal is determined based on (1) a detected signal delay for communications between the particular mobile terminal and the first orbital base station, and (2) a detected Doppler shift of the communications between the particular mobile terminal and the first orbital base station.

12. The method of any one or more of clauses 1 to 11, wherein a network parameter set specifies frequency band use, protocol use, beam direction, lobe shape, and/or base station location.

13. A non-transitory computer-readable storage medium storing instructions, which when executed by at least one processor of a computer system, causes the computer system to carry out the method of any one of clauses 1 to 12.

14. A network operations controller that coordinates network services in a communication network used by mobile terminals to communicate via base stations using a protocol supported by the mobile terminals for communications with a terrestrial base stations and orbital base stations, the network operations controller comprising:

a clock circuit for determining a current time;

a first input for receiving terrestrial network configuration inputs, wherein the terrestrial network configuration inputs includes an indication of location and capability among a plurality of terrestrial base stations;

a second input for receiving satellite orbital data, wherein the satellite orbital data includes orbital timing, location, and capability of a plurality of orbital base stations;

logic for determining network parameter sets, wherein the logic is configured to:

(1) determine a first terrestrial coverage area over which a first terrestrial base station is able to close a link with mobile terminals that are within the first terrestrial coverage area;

(2) determine a second terrestrial coverage area over which a first orbital base station is able to close a link with mobile terminals that are within the second terrestrial coverage area;

(3) determine an overlap area between the first terrestrial coverage area and the second terrestrial coverage area;

(4) determine a first network parameter set for use at least in in the overlap area for communications with the first terrestrial base station; and (5) determine a second network parameter set for use at least in in the overlap area for communications with the first orbital base station, wherein at least a portion of the first network parameter set and/or a portion of the second network parameter set are specified to avoid or reduce interference between simultaneous communications in the overlap area with the first terrestrial base station and with the first orbital base station;

a first network interface for conveying a first network parameter set message to the first terrestrial base station wherein the first network parameter set message includes a representation of the first network parameter set; and a second network interface for conveying a second network parameter set message to the first orbital base station wherein the second network parameter set message includes a representation of the second network parameter set.

15. The network operations controller of clause 14, wherein the first network parameter set includes a first specification of which frequency blocks of a plurality of frequency blocks usable according to the protocol that the first terrestrial base station is to use for communications with mobile terminals found to be located in the overlap area and the second network parameter set includes a second specification of which frequency blocks of the plurality of frequency blocks that the first orbital base station is to use for communications with mobile terminals found to be located in the overlap area.

16. The network operations controller of clause 14 or clause 15, wherein the plurality of frequency blocks is allocated among the plurality of terrestrial base stations and the plurality of orbital base stations based at least upon static locations of the plurality of terrestrial base stations and a current time location of the plurality of orbital base stations to reduce or eliminate multiple use of a given frequency block by multiple base stations that have overlapping coverage areas.

17. The network operations controller of any one or more of clauses 14 to 16, wherein the overlap area is determined by measurement of signal strength of signals from base stations at a mobile terminal location.

18. The network operations controller of any one or more of clauses 14 to 17, wherein the network parameter sets are assigned to base stations wherein at least one base station has a coverage area comprising a plurality of subregions with each subregion corresponding to a portion of the coverage area that meets a set of performance parameters.

19. The network operations controller of clause 18, wherein the set of performance parameters for a subregion corresponds to signal strength within the subregion.

20. The network operations controller of clause 18 or clause 19, wherein an actual or estimated signal strength within subregions of the plurality of subregions is determined by experiment, by estimation, and/or by processing of signals from mobile terminals in the subregions.

In the foregoing specification, embodiments of the invention have been described with reference to numerous specific details that may vary from implementation to implementation. The specification is, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

All references, including publications, patent applications, and patents, cited herein are hereby incorporated by reference to the same extent as if each reference were individually and specifically indicated to be incorporated by reference and were set forth in its entirety herein.

What is claimed is:

1. A method for coordinating network services from a network controller in a communication network used by mobile terminals to communicate via base stations using a protocol supported by the mobile terminals for communications with terrestrial base stations and orbital base stations, the method comprising:

determining a first terrestrial coverage area over which a first terrestrial base station is able to close links between the first terrestrial base station and a first set of mobile terminals that are within the first terrestrial coverage area;

determining a second terrestrial coverage area over which a first orbital base station is able to close links between the first orbital base station and a second set of mobile terminals that are within the second terrestrial coverage area;

determining an overlap area between the first terrestrial coverage area and the second terrestrial coverage area and a coverage time for the first orbital base station to provide services in the overlap area;

determining a first network parameter set for use at least in the overlap area for communications between the mobile terminals in the first set of mobile terminals and the first terrestrial base station;

determining a second network parameter set for use at least in the overlap area for communications between the mobile terminals in the second set of mobile terminals and the first orbital base station, wherein at least a portion of the first network parameter set and/or a portion of the second network parameter set are specified to avoid or reduce interference between simultaneous communications in the overlap area with the first terrestrial base station and with the first orbital base station, and wherein at least one parameter of the second network parameter set varies over the coverage time based on movement of the first orbital base station;

conveying, from the network controller, a first network parameter set message to the first terrestrial base station wherein the first network parameter set message includes a representation of the first network parameter set; and conveying, from the network controller, a second network parameter set message to the first orbital base station wherein the second network parameter set message includes a representation of the second network parameter set.

2. The method of claim 1, wherein the first network parameter set includes a first specification of which frequency blocks of a plurality of frequency blocks usable according to the protocol that the first terrestrial base station is to use for communications with mobile terminals found to be located in the overlap area and the second network parameter set includes a second specification of which frequency blocks of the plurality of frequency blocks that the first orbital base station is to use for communications with mobile terminals found to be located in the overlap area.

3. The method of claim 2, wherein the plurality of frequency blocks is allocated among a plurality of terrestrial base stations and a plurality of orbital base stations based at least upon static locations of the plurality of terrestrial base stations and a current time location of the plurality of orbital base stations to reduce or eliminate multiple use of a given frequency block by multiple base stations that have overlapping coverage areas.

4. The method of claim 1, wherein the overlap area is determined by measurement of signal strength of signals from base stations at a mobile terminal location.

5. The method of claim 1, wherein network parameter sets are assigned to base stations wherein at least one base station has a coverage area comprising a plurality of subregions with each subregion corresponding to a portion of the coverage area that meets a set of performance parameters.

6. The method of claim 5, wherein the set of performance parameters for a subregion corresponds to signal strength within the subregion.

7. The method of claim 5, further comprising determining an actual or estimated signal strength within subregions of the plurality of subregions, determined by experiment, by estimation, and/or by processing of signals from mobile terminals in the subregions.

8. The method of claim 1, wherein the first terrestrial coverage area and the second terrestrial coverage area are defined within a footprint of coverage on the Earth's surface.

9. The method of claim 1, wherein at least the second terrestrial coverage area is defined within a three-dimensional space.

10. The method of claim 1, wherein determining the second terrestrial coverage area comprises:

initiating communications between the first orbital base station and a particular mobile terminal;

determining, from the communications, a distance between the first orbital base station and the particular mobile terminal;

determining, from the communications, a direction of the particular mobile terminal relative to the first orbital base station; and determining a containing area of the particular mobile terminal based on a determined location of the particular mobile terminal, whereby a set of network parameters specific to the containing area are allocated for use by the first orbital base station.

11. The method of claim 10, wherein the determined location of the particular mobile terminal is determined based on (1) a detected signal delay for communications between the particular mobile terminal and the first orbital base station, and (2) a detected Doppler shift of the communications between the particular mobile terminal and the first orbital base station.

12. The method of claim 1, wherein a network parameter set specifies frequency band use, protocol use, beam direction, lobe shape, and/or base station location.

13. A non-transitory computer-readable storage medium storing instructions, which when executed by at least one processor of a computer system, causes the computer system to carry out the method of claim 1.

14. A network operations controller that coordinates network services using a network controller in a communication network used by mobile terminals to communicate via base stations using a protocol supported by the mobile terminals for communications with terrestrial base stations and orbital base stations, the network operations controller comprising:

a clock circuit for determining a current time;

a first input for receiving terrestrial network configuration inputs, wherein the terrestrial network configuration inputs include an indication of location and capability among a plurality of terrestrial base stations;

a second input for receiving satellite orbital data, wherein the satellite orbital data includes orbital timing, location, and capability of a plurality of orbital base stations;

logic for determining network parameter sets, wherein the logic is configured to:

(1) determine a first terrestrial coverage area over which a first terrestrial base station is able to close links between the first terrestrial base station and a first set of mobile terminals that are within the first terrestrial coverage area;

(2) determine a second terrestrial coverage area over which a first orbital base station is able to close links between the first orbital base station and a second set of mobile terminals that are within the second terrestrial coverage area;

(3) determine an overlap area between the first terrestrial coverage area and the second terrestrial coverage area and a coverage time for the first orbital base station to provide services in the overlap area;

(4) determine a first network parameter set for use at least in the overlap area for communications between the mobile terminals in the first set of mobile terminals and the first terrestrial base station; and (5) determine a second network parameter set for use at least in the overlap area for communications between the mobile terminals in the second set of mobile terminals and the first orbital base station, wherein at least a portion of the first network parameter set and/or a portion of the second network parameter set are specified to avoid or reduce interference between simultaneous communications in the overlap area with the first terrestrial base station and with the first orbital base station, and wherein at least one parameter of the second network parameter set varies over the coverage time based on movement of the first orbital base station;

a first network interface for conveying, from the network controller, a first network parameter set message to the first terrestrial base station wherein the first network parameter set message includes a representation of the first network parameter set; and a second network interface for conveying, from the network controller, a second network parameter set message to the first orbital base station wherein the second network parameter set message includes a representation of the second network parameter set.

15. The network operations controller of claim 14, wherein the first network parameter set includes a first specification of which frequency blocks of a plurality of frequency blocks usable according to the protocol that the first terrestrial base station is to use for communications with mobile terminals found to be located in the overlap area and the second network parameter set includes a second specification of which frequency blocks of the plurality of frequency blocks that the first orbital base station is to use for communications with mobile terminals found to be located in the overlap area.

16. The network operations controller of claim 15, wherein the plurality of frequency blocks is allocated among the plurality of terrestrial base stations and the plurality of orbital base stations based at least upon static locations of the plurality of terrestrial base stations and a current time location of the plurality of orbital base stations to reduce or eliminate multiple use of a given frequency block by multiple base stations that have overlapping coverage areas.

17. The network operations controller of claim 14, wherein the overlap area is determined by measurement of signal strength of signals from base stations at a mobile terminal location.

18. The network operations controller of claim 14, wherein the network parameter sets are assigned to base stations wherein at least one base station has a coverage area comprising a plurality of subregions with each subregion corresponding to a portion of the coverage area that meets a set of performance parameters.

19. The network operations controller of claim 18, wherein the set of performance parameters for a subregion corresponds to signal strength within the subregion.

20. The network operations controller of claim 18, wherein an actual or estimated signal strength within subregions of the plurality of subregions is determined by experiment, by estimation, and/or by processing of signals from mobile terminals in the subregions.

* * * * *